US012559121B2

(12) United States Patent
Yasui

(10) Patent No.: US 12,559,121 B2
(45) Date of Patent: Feb. 24, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/122,160

(22) Filed: Mar. 16, 2023

(65) Prior Publication Data

US 2023/0311918 A1     Oct. 5, 2023

(30) Foreign Application Priority Data

Mar. 31, 2022     (JP) ................................ 2022-058122

(51) Int. Cl.
*B60W 50/14*         (2020.01)
*B60K 35/10*         (2024.01)
(Continued)

(52) U.S. Cl.
CPC ............. *B60W 50/14* (2013.01); *B60K 35/10* (2024.01); *B60K 35/22* (2024.01); *B60K 35/28* (2024.01);
(Continued)

(58) Field of Classification Search
CPC . B60W 50/14; B60W 2050/146; B60K 35/00; B60K 35/28; B60K 2360/1868; B60K 35/29
(Continued)

(56) References Cited

U.S. PATENT DOCUMENTS 10,595,176 B1 *   3/2020   Gallagher ................ G05D 1/02
2004/0210364 A1 *  10/2004   Kudo ..................... G08G 1/166
                                                      348/148
(Continued)

FOREIGN PATENT DOCUMENTS

JP        11-016097         1/1999
JP       2006-264524       10/2006
(Continued)

OTHER PUBLICATIONS

Japanese Office Action for Japanese Patent Application No. 2022-058122 mailed Jul. 29, 2025.

*Primary Examiner* — Brian A Zimmerman
*Assistant Examiner* — Thang D Tran
(74) *Attorney, Agent, or Firm* — Amin, Turocy & Watson, LLP

(57)                    ABSTRACT

A driving assistance device of an embodiment includes a recognizer that recognizes a surroundings situation of a vehicle, a display controller that causes an image for assisting an occupant driving the vehicle to be displayed in a plurality of preset display modes on a display device, and a driving controller, the plurality of display modes include at least a display mode corresponding to a mode in which the vehicle travels on a narrow road, the display controller causes an image imitating the vehicle to be displayed when the display controller causes an image to be displayed in a display mode corresponding to the narrow road, and causes a direction in which the vehicle should travel to be displayed and causes an image for prompting the occupant to perform a steering operation to be displayed when there is an object around the vehicle.

9 Claims, 19 Drawing Sheets

(51) Int. Cl.

| | |
|---|---|
| *B60K 35/22* | (2024.01) |
| *B60K 35/28* | (2024.01) |
| *B60K 35/29* | (2024.01) |
| *B60K 35/65* | (2024.01) |
| *B60K 35/81* | (2024.01) |
| *B60K 35/23* | (2024.01) |
| *B60K 35/26* | (2024.01) |
| *B60K 35/60* | (2024.01) |

(52) U.S. Cl.
CPC ............ *B60K 35/29* (2024.01); *B60K 35/654* (2024.01); *B60K 35/81* (2024.01); *B60K 35/23* (2024.01); *B60K 35/26* (2024.01); *B60K 35/60* (2024.01); *B60K 2360/171* (2024.01); *B60K 2360/1868* (2024.01); *B60W 2050/146* (2013.01)

(58) Field of Classification Search
USPC ....................................................... 340/425.5
See application file for complete search history.

(56) References Cited

U.S. PATENT DOCUMENTS

| | | | |
|---|---|---|---|
| 2006/0215020 A1* | 9/2006 | Mori | B60R 1/27 348/148 |
| 2007/0003162 A1* | 1/2007 | Miyoshi | G06T 15/20 382/276 |
| 2009/0076676 A1* | 3/2009 | Yamamoto | G06F 3/0338 701/31.4 |
| 2012/0249791 A1* | 10/2012 | Shen | B60R 1/23 348/148 |
| 2013/0226445 A1* | 8/2013 | Nagata | G06F 17/00 701/300 |
| 2015/0066364 A1* | 3/2015 | Fujimoto | H04L 67/12 701/522 |
| 2016/0117922 A1* | 4/2016 | Oh | G01C 21/3691 348/118 |
| 2016/0121895 A1* | 5/2016 | Seo | B60W 50/14 701/70 |
| 2016/0196098 A1* | 7/2016 | Roth | G09G 5/00 715/761 |
| 2016/0335892 A1* | 11/2016 | Okada | G08G 1/164 |
| 2017/0069212 A1* | 3/2017 | Miyazawa | G08G 1/16 |
| 2017/0120925 A1* | 5/2017 | Stefan | G01C 21/3697 |
| 2017/0236413 A1* | 8/2017 | Takagi | G08G 1/095 701/117 |
| 2017/0274931 A1* | 9/2017 | Yang | B62D 15/029 |
| 2017/0324948 A1* | 11/2017 | Lin | B60R 1/27 |
| 2018/0128635 A1* | 5/2018 | Nakamura | B60W 30/18163 |
| 2018/0154824 A1* | 6/2018 | Urano | B60W 50/082 |
| 2018/0194280 A1* | 7/2018 | Shibata | B60K 28/02 |
| 2018/0261081 A1* | 9/2018 | Suzuki | B60Q 1/525 |
| 2018/0326999 A1* | 11/2018 | Hershkovitz | G06V 40/20 |
| 2018/0345988 A1* | 12/2018 | Mimura | B60W 50/082 |
| 2019/0001968 A1* | 1/2019 | Yorifuji | B60K 35/22 |
| 2019/0039628 A1* | 2/2019 | Mizuno | G08G 1/165 |
| 2019/0130742 A1* | 5/2019 | Tokunaga | G08G 1/09 |
| 2019/0145786 A1* | 5/2019 | Yamaguchi | G01C 21/3484 701/411 |
| 2019/0147272 A1* | 5/2019 | Yokota | G06V 40/18 340/576 |
| 2019/0329716 A1* | 10/2019 | Kubota | B60K 35/00 |
| 2020/0010118 A1* | 1/2020 | Fukaya | B62D 15/029 |
| 2020/0012097 A1* | 1/2020 | Kubota | G02B 27/01 |
| 2020/0086890 A1* | 3/2020 | Ikeda | G09G 5/37 |
| 2020/0118433 A1* | 4/2020 | Sakai | G01C 21/26 |
| 2020/0172123 A1* | 6/2020 | Kubota | B60W 60/0053 |
| 2020/0307594 A1* | 10/2020 | Kato | B60K 35/81 |
| 2020/0324691 A1* | 10/2020 | Iwasaki | B60Q 1/346 |
| 2020/0339155 A1* | 10/2020 | Fukumoto | B60W 60/0015 |
| 2020/0361488 A1* | 11/2020 | Miura | B60W 30/18159 |
| 2020/0369150 A1* | 11/2020 | Nakajima | G01C 21/367 |
| 2020/0391752 A1* | 12/2020 | Hagiwara | G06V 10/80 |
| 2020/0406747 A1* | 12/2020 | Sakai | G08G 1/167 |
| 2021/0064891 A1* | 3/2021 | Kimura | G06F 3/14 |
| 2021/0094585 A1* | 4/2021 | Yamasaki | B60Q 1/04 |
| 2021/0146836 A1* | 5/2021 | Lee | H04N 23/698 |
| 2021/0223058 A1* | 7/2021 | Horihata | G01C 21/3635 |
| 2021/0237776 A1* | 8/2021 | Hashimoto | B60W 40/09 |
| 2021/0306551 A1 | 9/2021 | Okabe et al. | |
| 2021/0310822 A1* | 10/2021 | Matsumaru | G08G 1/0969 |
| 2021/0372810 A1* | 12/2021 | Hato | G09G 5/38 |
| 2022/0067409 A1* | 3/2022 | Kurata | B60W 40/04 |
| 2022/0111730 A1* | 4/2022 | Kakimaru | G06F 3/0481 |
| 2022/0169269 A1* | 6/2022 | Yang | G06V 40/103 |
| 2022/0262297 A1* | 8/2022 | Aoki | G07C 5/0825 |
| 2022/0305911 A1* | 9/2022 | Sakai | G06T 11/00 |
| 2022/0305912 A1* | 9/2022 | Yokochi | B60W 40/06 |
| 2022/0306094 A1* | 9/2022 | Sekikawa | B60K 35/29 |
| 2022/0379925 A1* | 12/2022 | Sato | B60W 60/0059 |
| 2024/0042855 A1* | 2/2024 | Zemek | B60W 30/0956 |
| 2024/0294115 A1* | 9/2024 | Komatsu | B60R 1/25 |

FOREIGN PATENT DOCUMENTS

| | | |
|---|---|---|
| JP | 2018-097804 | 6/2018 |
| JP | 2018-203013 | 12/2018 |
| JP | 2019-016825 | 1/2019 |
| JP | 2019-027996 | 2/2019 |
| JP | 2020-149204 | 9/2020 |
| JP | 2020-154701 | 9/2020 |
| JP | 2021-157291 | 10/2021 |

\* cited by examiner

FIG. 1

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-058122, filed on Mar. 31, 2022, the content of which is incorporated herein by reference.

BACKGROUND

Field of the Invention

The present invention relates to a driving assistance device, a driving assistance method, and a storage medium.

Description of Related Art

In recent years, efforts to provide access to a sustainable transportation system in consideration of vulnerable people among traffic participants have become active. In order to realize this, research and development for further improving the safety and convenience of transportation through research and development regarding a driving assistance technology has been focused upon. In relation thereto, a technology for determining whether or not assistance for passing-driving of a host vehicle is to be permitted on the basis of a speed of an oncoming vehicle when a host vehicle and an oncoming vehicle will pass each other in a passing state on a narrow road, and causing an image captured by a side camera to be displayed on a display when a determination is made that assistance for passing-driving is to be permitted is known (for example, Japanese Unexamined Patent Application, First Publication No. 2020-149204).

SUMMARY

Incidentally, in a driving assistance technology, appropriate images according to various other surroundings situations cannot be displayed in some cases.

Aspects of the present invention have been made in consideration of such circumstances, and one object thereof is to provide a driving assistance device, a driving assistance method, and a storage medium capable of performing more appropriate driving assistance according to a surroundings situation. Further, this will contribute to the development of a sustainable transportation system.

The driving assistance device, driving assistance method, and storage medium according to the present invention adopt the following configurations.

(1): A driving assistance device according to an aspect of the present invention includes a recognizer configured to recognize a surroundings situation of a vehicle; a display controller configured to cause an image for assisting an occupant driving the vehicle to be displayed in a plurality of preset display modes on a display device; and a driving controller configured to control a driving operation with respect to the vehicle by the occupant or traveling of the vehicle, wherein the plurality of display modes include display modes corresponding to at least a first mode in which the vehicle travels in a direction in which the road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects, the display controller causes transition to any one of the plurality of display modes to be performed on the basis of the surroundings situation recognized by the recognizer, and the display controller causes an image imitating the vehicle to be displayed when the display controller causes an image to be displayed in a display mode corresponding to the fourth mode, and causes a direction in which the vehicle should travel to be displayed and causes an image for prompting the occupant to perform a steering operation to be displayed when there is an object around the vehicle.

(2): In the aspect (1), the display controller selects an image to be displayed, from among at least an image imitating the vehicle, an image showing a position of an object around the vehicle, an image showing a direction in which the vehicle should travel, a target position serving as a lane change destination of the vehicle, an image for prompting acceleration or deceleration, and an image for prompting the occupant to perform a steering operation on the basis of a display mode transitioning on the basis of the surroundings situation recognized by the recognizer, and causes the image to be displayed.

(3): In the aspect (2), the display controller causes an image imitating the vehicle in the third mode and the fourth mode to be displayed as an image when the vehicle is viewed from above, and causes an image imitating the host vehicle M in the first mode, the second mode, and the fifth mode to be displayed as an image when the host vehicle M is viewed from behind.

(4): In the aspect (1), when the display controller causes the image to be displayed in a display mode corresponding to the fourth mode, the display controller causes the image imitating the vehicle to be displayed to be larger than the image imitating the vehicle displayed in the third mode.

(5): In the aspect (1), the display controller causes an image to be displayed in a display mode corresponding to the fourth mode when a width of a road of the vehicle recognized by the recognizer is smaller than a predetermined value, or when the vehicle travels while avoiding an object present in front of the vehicle or when the vehicle passes an oncoming traveling object, and when a distance to the object is smaller than a predetermined distance and a time to collision between the vehicle and the object is equal to or greater than a threshold value.

(6): In the aspect (5), the driving controller performs control to guide the occupant to perform a steering operation for avoiding contact between the vehicle and the object.

(7): In the aspect (6), the driving controller performs an operation of guiding the occupant to perform steering by using a reaction force to a steering wheel operated by the occupant.

(8): In the above aspect (1), the display controller causes an image to be displayed in a display mode corresponding to the fourth mode when the recognizer recognizes another vehicle present in front of the vehicle and stopping while waiting for a right turn or a left turn.

(9): A driving assistance method according to an aspect of the present invention includes recognizing, by a computer, a surroundings situation of a vehicle; causing, by the computer, an image for assisting an occupant driving the vehicle to be displayed in a plurality of preset display modes on a display device; executing, by the computer, driving control for controlling a driving operation with respect to the vehicle by the occupant or traveling of the vehicle, the plurality of display modes including display modes corresponding to at least a first mode in which the vehicle travels in a direction in which the road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects; causing, by the computer, transition to any one of the plurality of display modes to be performed on the basis of the recognized surroundings situation; causing, by the computer, an image imitating the vehicle to be displayed when causing an image to be displayed in a display mode corresponding to the fourth mode; and causing, by the computer, a direction in which the vehicle should travel to be displayed and causing an image for prompting the occupant to perform a steering operation to be displayed when there is an object around the vehicle.

(10): A storage medium according to an aspect of the present invention is a computer-readable non-transitory storage medium having a program stored therein, the program causing a computer to: recognize a surroundings situation of a vehicle; cause an image for assisting an occupant driving the vehicle to be displayed in a plurality of preset display modes on a display device; execute driving control for controlling a driving operation with respect to the vehicle by the occupant or traveling of the vehicle, the plurality of display modes including display modes corresponding to at least a first mode in which the vehicle travels in a direction in which the road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects; cause transition to any one of the plurality of display modes to be performed on the basis of the recognized surroundings situation; cause an image imitating the vehicle to be displayed when causing an image to be displayed in a display mode corresponding to the fourth mode; and cause a direction in which the vehicle should travel to be displayed and cause an image for prompting the occupant to perform a steering operation to be displayed when there is an object around the vehicle.

According to the aspects (1) to (10), it is possible to perform more appropriate driving assistance according to the surroundings situation.

BRIEF DESCRIPTION OF THE DRAWINGS

FIG. 1 is a configuration diagram of a vehicle system using a driving assistance device according to an embodiment.

DESCRIPTION OF EMBODIMENTS

Figure 2:
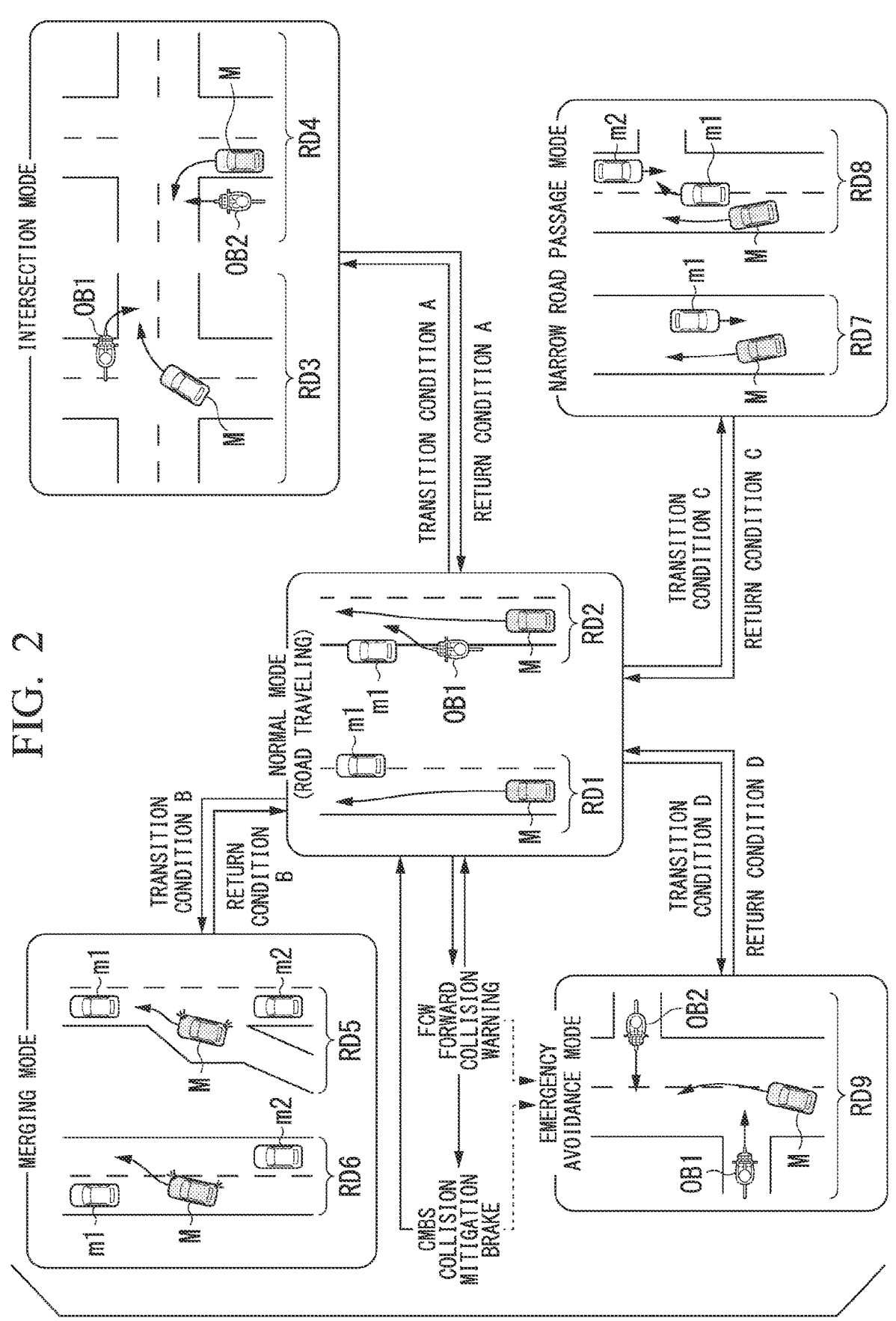
FIG. 2 is a diagram for describing a function of a determiner.

Hereinafter, embodiments of a driving assistance device, a driving assistance method, and a storage medium of the present invention will be described with reference to the drawings. Hereinafter, a case in which a left-hand traffic regulation is applied will be described, but when a right-hand traffic regulation is applied, the right and the left may be reversed.

[Overall Configuration]

Figure 1:
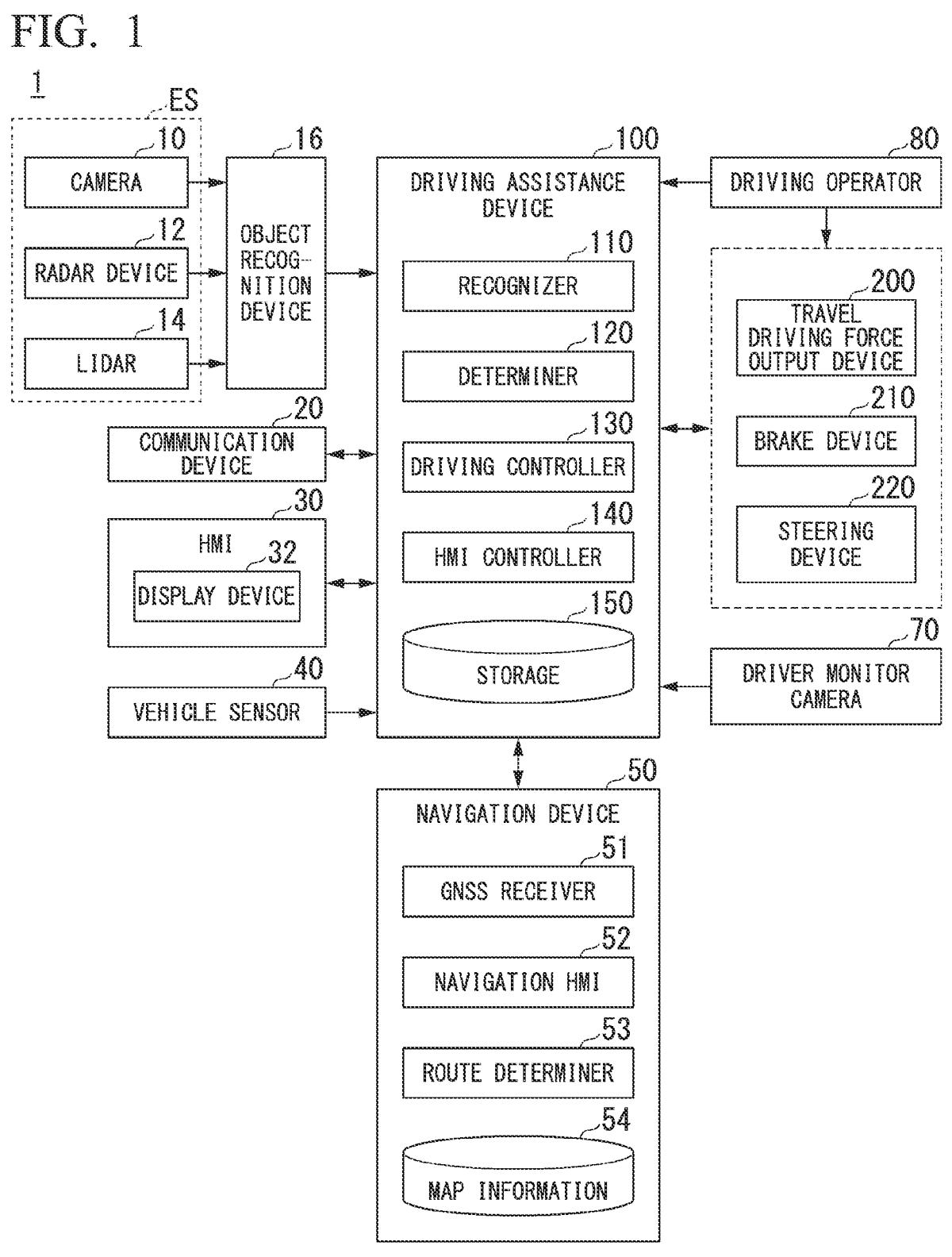

FIG. 1 is a configuration diagram of a vehicle system 1 using a driving assistance device according to an embodiment. A vehicle on which the vehicle system 1 is mounted (hereinafter referred to as a host vehicle M) is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell. Hereinafter, the driving assistance device may be applied to an automated driving vehicle. The automated driving is, for example, to automatically control one or both of steering and acceleration or deceleration of the host vehicle M to execute driving control. Examples of the driving control of the host vehicle M may include various driving assistance such as adaptive cruise control (ACC), auto lane changing (ALC), lane keeping assistance system (LKAS), forward collision warning (FCW), and collision mitigation braking system (CMBS). The automated driving vehicle may be a vehicle whose driving is partially or wholly controlled by manual driving of an occupant (driver).

The vehicle system 1 includes, for example, a camera (an example of an imager) 10, a radar device 12, a light detection and ranging (LIDAR) 14, an object recognition device 16, a communication device 20, a human machine interface (HMI) 30, a vehicle sensor 40, a navigation device 50, a driver monitor camera 70, a driving operator 80, a driving assistance device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or other configurations may be added thereto. A combination of the camera 10, the radar device 12, and the LIDAR 14 is an example of an "external sensor ES". The external sensor ES may include another detector (for example, sonar) that recognizes a surroundings situation of the vehicle, and may include the object recognition device 16. The external sensor ES may be configured of only the camera 10 or may have a simple configuration with only the camera 10 and the radar device 12. The HMI 30 is an example of an "output device".

The camera 10 is, for example, a digital camera using a solid-state imaging device such as a charge coupled device (CCD) or a complementary metal oxide semiconductor (CMOS). The camera 10 is attached to any location on a host vehicle M. When a forward side of the host vehicle M is imaged, the camera 10 is attached to, for example, an upper portion of a front windshield, a rear surface of a rearview mirror, or the like. When a backward side of the host vehicle M is imaged, the camera 10 is attached to an upper portion of a rear windshield, a back door, or the like. When a sideward side and a rear sideward side of the host vehicle M are imaged, the camera 10 is attached to a door mirror or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target on the basis of a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 included in the external sensor ES to recognize a position, type, speed, and the like of the object. The object recognition device 16 outputs recognition results to the driving assistance device 100. The object recognition device 16 may output detection results of the camera 10, the radar device 12, and the LIDAR 14 as they are to the driving assistance device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to the occupant of the host vehicle M under the control of an HMI controller 140, and receives input operations by the occupant. The HMI 30 includes, for example, a display device 32. The display device 32 is, for example, a liquid crystal display (LCD) or an organic electro luminescence (EL) display device. The display device 32 is provided, for example, near the front of a seat of a driver (a seat closest to a steering wheel) in an instrument panel, and is installed at a position visible to the occupant through a gap in the steering wheel or through the steering wheel. The display device 32 may be installed at a center of the instrument panel. The display device 32 may be a head up display (HUD). The HUD projects an image onto a portion of the front windshield in front of the seat of the driver, thereby allowing eyes of the occupant seated on the seat of the driver to visually recognize a virtual image. The display device 32 displays images that are generated by the HMI controller 140, which will be described below. The HMI 30 may include, for example, a speaker, a switch, a microphone, a buzzer, a touch panel, a key. The HMI 30 may include, for example, a driving changeover switch for switching between automatic driving and manual driving by the occupant. The switch includes, for example, a blinker switch (a direction indicator). The blinker switch is provided, for example, on a steering column or a steering wheel. The blinker switch is an example of an operator that receives an instruction to change the lane of the host vehicle M from the occupant, for example. The switch may include a switch for adjusting a set speed of the host vehicle M.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M. The vehicle sensor 40 may include a steering angle sensor that detects a steering angle of the host vehicle M (which may be an angle of a steered wheel or an operating angle of the steering wheel). The vehicle sensor 40 may include a position sensor that acquires a position of the host vehicle M. The position sensor is, for example, a sensor that acquires position information (longitude and latitude information) from a global positioning system (GPS) device. The position sensor may be a sensor that acquires position information using a global navigation satellite system (GNSS) receiver 51 of the navigation device 50.

The navigation device 50 includes, for example, a global navigation satellite system (GNSS) receiver 51, a navigation HMI 52, and a route determiner 53. The navigation device 50 holds map information 54 in a storage device such as a hard disk drive (HDD) or a flash memory. The GNSS receiver 51 specifies a position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The map information 54 is, for example, information in which a road shape is represented by links indicating roads and nodes connected by the links. The map information 54 may include a curvature of the road, point of interest (POI) information, and the like. The map information 54 may include, for example, lane center information or lane boundary information, and may include road information, traffic regulation information, address information (an address and postal code), facility information, telephone number information, and the like. The map information 54 may be updated at any time by the communication device 20 communicating with another device.

The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The driver monitor camera 70 is, for example, a digital camera using a solid-state imaging device such as a CCD or CMOS. The driver monitor camera 70 is attached to any location on the host vehicle M at a position and orientation at which a head of an occupant (hereinafter referred to as a driver) seated in a seat of the driver of the host vehicle M can be imaged from the front (in an orientation in which a face is imaged). For example, the driver monitor camera 70 is attached to an upper part of the display device provided in the central part of the instrument panel of the host vehicle M. The driver monitor camera 70 outputs, to the driving assistance device 100, an image obtained by imaging the vehicle cabin including the driver of the host vehicle M from a position at which the driver monitor camera 70 is disposed.

The driving operator 80 includes, for example, an accelerator pedal, a brake pedal, a shift lever, and other operators, in addition a steering wheel. A sensor that detects an amount of operation or the presence or absence of an operation is attached to the driving operator 80, and a detection result thereof is applied to the driving assistance device 100, or some or all of the travel driving force output device 200, the brake device 210, and the steering device 220. The steering wheel is an example of "an operator that receives a steering operation by a driver". The operator does not necessarily have to be annular, and may be in the form of a modified steering wheel, joystick, buttons, or the like. A steering grip sensor 84 is attached to the steering wheel 82. The steering grip sensor 84 is realized by a capacitive sensor or the like, and outputs, to the driving assistance device 100, a signal capable of detecting whether or not the driver is gripping the steering wheel 82 (which means that the driver is in contact with the steering wheel 82 in a state in which force can be applied). The steering wheel may be provided with a mechanism that applies a reaction force for steering in a predetermined direction (or not for steering in the predetermined direction) to the occupant (driver) under the control of the driving assistance device 100.

The driving assistance device 100 includes, for example, a recognizer 110, a determiner 120, a driving controller 130, an HMI controller 140, and a storage 150. The recognizer 110, the determiner 120, the driving controller 130, and the HMI controller 140 are realized, for example, by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the driving assistance device 100 in advance or may be stored in a detachable storage medium such as a DVD or a CD-ROM and installed in the HDD or flash memory of the driving assistance device 100 by the storage medium (a non-transitory storage medium) being mounted in a drive device. The HMI controller 140 is an example of a "display controller".

The storage 150 may also be realized by the various storage devices, a solid state drive (SSD), an electrically erasable programmable read only memory (EEPROM), a read only memory (ROM), a random access memory (RAM), or the like. The storage 150 stores, for example, programs and other various types of information. The map information 54, for example, may be stored in the storage 150.

The recognizer 110 recognizes a state such as a position, speed, or acceleration of an object present around the host vehicle M (within a predetermined distance from the host vehicle M) on the basis of information input from the external sensor ES. The object is, for example, a traffic participant such as another vehicle, a bicycle, and a pedestrian. The position of the object, for example, is recognized as a position at absolute coordinates with a representative point (a centroid, a drive shaft center, or the like) of the host vehicle M as an origin, and is used for control. The position of the object may be represented by a representative point such as a centroid or a corner of the object or may be represented by an area. The "state" of the object may include an acceleration or jerk of the object, or an "action status" (for example, whether or not the object is changing lanes or is about to change lanes). The recognizer 110 may recognize a type (another vehicle, a bicycle, or a pedestrian) of the object, or the like on the basis of feature information such as a size, shape, and color of the object.

The recognizer 110 recognizes, for example, a lane in which the host vehicle M is traveling (traveling lane). For example, the recognizer 110 recognizes left and right demarcation lines of the host vehicle M from a camera image captured by the camera 10, and recognizes the traveling lane on the basis of positions of the recognized demarcation lines. The recognizer 110 may recognize targets (a traveling road boundary or a road boundary) that can specify a lane position including a road shoulder, a curb, a median strip, a guard rail, a fence, a wall, or the like as well as the demarcation lines, to recognize the traveling lane. In this recognition, the position of the host vehicle M acquired from the navigation device 50 or a processing result of the INS may be additionally considered. The recognizer 110 recognizes a temporary stop line, an obstacle, a red signal, a toll gate, and other road events.

The recognizer 110 recognizes a position or posture of the host vehicle M with respect to the traveling lane when recognizing the traveling lane. The recognizer 110 may recognize, for example, a deviation of a reference point of the host vehicle M from a center of the lane and an angle formed between a traveling direction of the host vehicle M and a line connecting the center of the lane as a relative position and posture of the host vehicle M with respect to the traveling lane. Instead, the recognizer 110 may recognize, for example, a position of the reference point of the host vehicle M with respect to any one of side edge portions (the demarcation line or the road boundary) of the traveling lane as the relative position of the host vehicle M with respect to the traveling lane. The recognition of the traveling lane or the recognition of the position or posture of the host vehicle M with respect to the traveling lane by the recognizer 110 may be executed by a specifier 153, which will be described below.

The recognizer 110, for example, realizes in parallel a function using artificial intelligence (AI) and a function using a model given in advance. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation.

The recognizer 110 analyzes the image captured by the driver monitor camera 70 and recognizes a line-of-sight direction of the occupant (particularly, the driver) of the host vehicle M on the basis of an analysis result.

The determiner 120 determines a traveling state (traveling mode) of the host vehicle M to be executed by the driving controller 130 on the basis of a recognition result of the recognizer 110. Examples of the traveling modes of the host vehicle M include at least a road traveling mode (an example of a first mode) in which the host vehicle M travels in a direction in which the road extends (a direction in which the host vehicle M can travel), an intersection mode (an example of a second mode) in which the host vehicle M travels at an intersection, a merging mode (an example of a third mode) in which the host vehicle M travels in a merging section, a narrow road passage mode (an example of a fourth mode) in which the host vehicle M passes a road whose width is smaller than a predetermined value, and an emergency avoidance mode (an example of a fifth mode) for avoiding contact between the host vehicle M and an object. The road traveling mode is an example of a "normal mode." The merging mode may include a mode (lane change mode) in which the host vehicle M performs lane change from a traveling lane to an adjacent lane. The determiner 120 determines the traveling mode of the host vehicle M on the basis of a positional relationship between the host vehicle M and an object around the host vehicle M recognized by the recognizer 110 or road information around the host vehicle M obtained from the map information 54. The determiner 120 may determine a display mode associated with the traveling mode of the host vehicle M. The determiner may determine whether or not the host vehicle M comes into contact with a nearby object on the basis of a relative distance or relative speed between the host vehicle M and the nearby object, a movement direction, or the like, or determine whether a degree of approach is equal to or greater than a threshold value. A function of the determiner 120 will be described in detail below.

The driving controller 130 controls a driving operation with respect to the host vehicle M or the traveling of the host vehicle M by the occupant of the host vehicle M. For example, the driving controller 130 executes driving assistance corresponding to a traveling state of the host vehicle M determined by the determiner 120. Examples of the driving assistance include control for assigning a predetermined torque reaction force to the steering wheel of the driving operator 80 in order to cause the occupant to execute a steering operation in a predetermined direction, control for avoiding contact between the host vehicle M and an object, and control for changing the lane of the host vehicle M from the traveling lane to an adjacent lane. The driving controller 130 causes the HMI controller 140 to output information according to the traveling state of the host vehicle M from the HMI 30 so that the occupant (especially, the driver) of the host vehicle M can drive appropriately according to the traveling state of the host vehicle M.

The HMI controller 140 notifies the occupant of predetermined information using the HMI 30 or acquires content of an operation of the occupant via the HMI 30. Examples of the predetermined information include information related to traveling of the host vehicle M, such as information on a state of the host vehicle M or information on driving control. Examples of the information on the state of the host vehicle M include a speed of the host vehicle M, an engine speed, and a shift position. Examples of the information on the driving control include an inquiry as to whether or not to perform lane change, whether or not to execute each of the traveling modes (the first to fifth modes) described above, information on changing the driving mode, and information imposed on the occupant required for switching between driving modes (task request information for the occupant). The predetermined information may include information irrelevant to travel control of the host vehicle M, such as TV programs, and content (for example, movies) stored in a storage medium such as a DVD. Examples of the predetermined information may include a current position or destination of the host vehicle M, information on a remaining amount of fuel, information indicating whether or not the traveling lane of the host vehicle M can be specified, a remaining distance until the traveling mode is switched, a number-of-lanes increase or decrease direction, the increased or decreased number of lanes, and the number of lanes traveling in parallel to the traveling lane (the number of parallel traveling lanes).

For example, the HMI controller 140 may generate an image including the predetermined information described above and cause the generated image to be displayed on the display device 32 of the HMI 30, and may generate a sound indicating the predetermined information and cause the generated sound to be output from a speaker of the HMI 30. For example, the HMI controller 140 causes an image in a display mode corresponding to any one of the plurality of modes to be displayed on the display device 32 on the basis of the surroundings situation recognized by the recognizer 110. For example, the HMI controller 140 selects and generates an image to be displayed among at least an image imitating the host vehicle M, an image showing a position of an object around the host vehicle M, an image showing a direction in which the host vehicle M should travel, a target position that is a lane change destination of the host vehicle M, an image showing a direction that the occupant should watch, an image for prompting acceleration or deceleration, and an image for prompting the occupant to perform a steering operation on the basis of the display mode transitioning on the basis of the surroundings situation recognized by the recognizer, and causes the generated image to be displayed on the display device 32. The direction in which the host vehicle M should travel or the direction that the occupant of the host vehicle M should watch may be acquired on the basis of, for example, a position of the object with respect to the host vehicle M recognized by a predetermined recognition model, or may be acquired by inputting, for example, a current surroundings situation of the host vehicle M to a learned model that has been learned from data such as driving content or a line-of-sight direction of a skilled driver according to a surroundings situation included in a past driving history or the like. The HMI controller 140 may output information received by the HMI 30 to the communication device 20, the navigation device 50, the driving controller 130, and the like.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The ECU controls the above configuration according to information input from the driving assistance device 100 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the driving assistance device 100 or the information input from the driving operator 80 so that a brake torque according to a braking operation is output to each wheel. The brake device 210 may include, as a backup, a mechanism that transfers hydraulic pressure generated by operating the brake pedal included in the driving operator 80 to the cylinder via a master cylinder. The brake device 210 is not limited to the configuration described above, and may be an electronically controlled hydraulic brake device that controls an actuator according to information input from the driving assistance device 100 and transmits the hydraulic pressure of the master cylinder to the cylinder.

The steering device 220 includes, for example, a steering ECU and an electric motor. The electric motor, for example, changes orientations of steerable wheels by causing a force to act on a rack and pinion mechanism. The steering ECU drives the electric motor according to the information input from the driving assistance device 100 or the information input from the driving operator 80 to change the orientations of the steerable wheels. The steering device 220 may assign a torque reaction force so that the steering wheel is turned in a predetermined direction (so that the steering wheel is not turned in the predetermined direction) according to a driving operation of the occupant under the control of the driving assistance device 100.

[Determiner]

Next, a function of the determiner 120 will be described in detail. FIG. 2 is a diagram for describing the function of the determiner 120. In the example of FIG. 2, five modes (the normal mode (the first mode), the intersection mode (the second mode), the merging mode (the third mode), the narrow road passage mode (the fourth mode) and the emergency avoidance mode (the fifth mode)) indicating the traveling state of the host vehicle M described above are shown. For example, the determiner 120 determines that transition to a mode corresponding to a predetermined transition condition is performed when the predetermined transition condition is satisfied with reference to the normal mode (road traveling mode), and determines that transition to the normal mode has been performed when a predetermined return condition is satisfied in the mode after the transition. When a determination is made that the traveling state has transitioned to one mode, the driving controller 130 causes the HMI controller 140 to generate an image associated with a display mode based on a determination result, and causes the generated image to be displayed on the display device 32. Hereinafter, the transition condition and the return conditions to each mode shown in FIG. 2 will be described. Although a transition condition from the normal mode to another mode and a return condition from the other mode to the normal mode are set in the example of FIG. 2, a transition condition or a return condition between the respective modes may be set without passing through the normal mode.

<Normal Mode (Road Traveling Mode)>

The normal mode is a traveling mode in a case in which a determination is made that a shape of a road (lane) on which the host vehicle M is traveling is not a predetermined road shape such as an intersection, a merging lane, or a narrow road, and a likelihood of contact between the host vehicle M and another vehicle is low. The normal mode may be a traveling mode when a condition for transition to another mode is not satisfied or when a condition for returning to another mode is satisfied. The determiner 120, for example, may acquire a shape of the road on which the host vehicle M travels by referring to the map information (the map information 54) on the basis of the position information of the host vehicle M, and may acquire the shape on the basis of a detection result of the external sensor ES.

When the normal mode is executed, the HMI controller 140 causes the image imitating the host vehicle M to be displayed, causes the image showing the direction that the occupant should watch to be displayed when there is an object whose degree of approach to the host vehicle M (an index value indicating a likelihood of contact) is equal to or greater than a threshold value (likelihood of contact is low but a relative distance is smaller than a predetermined distance), and causes an image showing a relative position of an object with respect to the host vehicle M to be displayed when there is an object whose degree of approach to the host vehicle M is smaller than a threshold value (the likelihood of the contact is low but the relative distance is equal to or larger than the predetermined distance).

For example, when another vehicle m1 is present in front of the host vehicle M, an image showing a position of the other vehicle m1 with respect to the position of the host vehicle M is displayed on the display device 32, or a route for not coming into contact with the other vehicle m1 may be generated and displayed on the display device 32, as shown on the road RD1 in FIG. 2. When there is an object (traffic participant) OB1 such as a bicycle overtaking the other vehicle m1, the driving controller 130 may cause an image showing a position or direction of the other vehicle m1 or the object OB1 with respect to the position of the host vehicle M to be displayed on the display device 32 or cause an image showing a route for overtaking the other vehicle m1 or the object OB1 without coming into contact with the other vehicle m1 or the object OB1 to be displayed on the display device 32, as shown on the road RD2 in FIG. 2. The driving controller 130 may control one or both of steering and speed of the host vehicle M to perform driving control so that the host vehicle M does not come into contact with the object.

<Intersection Mode>

A condition (transition condition A) for transition from the normal mode to the intersection mode is, for example, that there is an intersection within a predetermined distance from the host vehicle M in the traveling direction of the host vehicle M by referring to the map information (the map information 54) on the basis of the position of the host vehicle M. The transition condition A may be a case in which the blinker switch of the HMI 30 has been actuated according to an operation of the occupant and either a left blinker or a right blinker is turned on (is blinking), in addition to the above condition. The determiner 120 may determine whether the host vehicle M is traveling on an intersection on the basis of the detection result of the external sensor ES, instead of (or in addition) referring to the map information. When the determiner 120 determines that transition to the intersection mode has been performed, the driving controller 130 causes the traveling mode of the host vehicle M to transition to the intersection mode.

When the transition to the intersection mode has occurred, the HMI controller 140 generates the image imitating the host vehicle M, generates an image showing a relative position of an object with respect to the host vehicle M when there is an object likely to come into contact with the host vehicle M at the intersection, generates the image showing the direction that the occupant should watch when the object is located in the traveling direction of the host vehicle M, and causes the generated image to be displayed on the display device 32.

For example, the HMI controller 140 causes an image showing the position of the other object (traffic participant) OB1 such as a bicycle passing through the intersection when the host vehicle M turns right to be displayed on the display device 32, as shown on a road RD3 in FIG. 2 or causes an image showing a position of another object (traffic participant) OB2 such as a bicycle passing near the intersection when the host vehicle M turns left to be displayed on the display device 32, as shown on the road RD4.

A condition for returning from the intersection mode to the normal mode (return condition A) is, for example, that the position of the host vehicle M is separated from the intersection by a predetermined distance or more. Further, the return condition A may include a case in which the host vehicle M is not traveling in a merging section or a narrow road and a likelihood of contact with another object is not high. The driving controller 130 may control one or both of the steering and the speed of the host vehicle M to perform driving control so that the host vehicle M does not come into contact with an object.

<Merging Mode>

A condition for transition from the normal mode to the merging mode (transition condition B) is, for example, a case in which the host vehicle M is traveling on a road that includes a plurality of lanes in which the host vehicle M can travel in the same direction, or a case in which it is recognized that a lane in which the host vehicle M is currently traveling merges with another lane, which is a case in which the blinker switch of the HMI 30 is actuated according to an operation of the occupant and either the left blinker or the right blinker is turned on (blinks). The transition condition B may include a case in which the road on which the host vehicle M is traveling is not near an intersection, in addition to the above condition. Further, the determiner 120 may determine the mode to be the merging mode when there is a merging section within a predetermined distance from the host vehicle M in the traveling direction of the host vehicle M by referring to the map information on the basis of the position of the host vehicle M, and determine the mode to be the lane change mode when there are no merging sections within the predetermined distance. The determiner 120 may determine whether or not the host vehicle M is traveling in a merging section on the basis of the detection result of the external sensor ES, instead of (or in addition to) referring to the map information.

When transition to the merging mode has occurred, the HMI controller 140 causes the image imitating the host vehicle M to be displayed, causes the other vehicle traveling in a lane that is a lane change destination to be displayed as an image with a first predetermined color, and causes an image showing a target position of the lane change destination to be displayed as an image with a second predetermined color. The HMI controller 140 causes the image with the first predetermined color and the image with the second predetermined color to be displayed side by side on the side in which the host vehicle M performs lane change with respect to the image imitating the host vehicle M. The HMI controller 140 may cause an image for accelerating or decelerating the host vehicle M on the basis of a positional relationship between the host vehicle M and the target position to be displayed.

For example, the HMI controller 140 causes an image for assisting driving for changing lanes from a merging lane to a main lane or changing lanes from the traveling lane to an adjacent lane so that the host vehicle M does not come into contact with other vehicles m1 and m2 present around the host vehicle M, as shown on roads RD5 and RD6 in FIG. 2 to be displayed on the display device 32.

The driving controller 130 may control one or both of the steering and the speed of the host vehicle M to perform driving control so that the host vehicle M does not come into contact with an object. The driving controller 130 may perform control to guide the occupant to perform a steering operation for causing the host vehicle M to change lanes. In this case, the driving controller 130 performs an operation for guiding the occupant to perform steering for lane change by using a reaction force to the steering wheel operated by the occupant.

The condition for returning from the merging mode to the normal mode (return condition B) is, for example, a case in which the blinker is turned off. Another condition may be that the position of the host vehicle M is separated from the merging section by a predetermined distance or more. Furthermore, the return condition B may include a case in which the host vehicle M is not traveling near an intersection or on a narrow road and is not likely to come into contact with another object.

<Narrow Road Passage Mode>

A condition (transition condition C) for transition from the normal mode to the narrow road passage mode is, for example, a case in which a width of a road of the host vehicle M is smaller than a predetermined value. The transition condition C is, for example, a case in which the host vehicle M travels while avoiding an object present in front of the host vehicle M or a case in which the host vehicle M passes an oncoming traveling object, which is a case in which a distance to the object is smaller than a predetermined distance and a time to collision TTC between the host vehicle M and the object is equal to or greater than a threshold value as shown on roads RD7 and RD8 in FIG. 2. Further, the transition condition C may include, for example, a case in which a minimum width of an area recognized as an area in which the host vehicle M can travel is smaller than a predetermined value (for example, a horizontal distance from a left edge of the road to a leftmost edge of a vehicle waiting for a right turn is smaller than a predetermined value). The time to collision TTC is, for example, a value that is calculated by dividing a relative distance by a relative speed in a relationship between the host vehicle M and the object. The threshold value may be, for example, a fixed value or may be a variable value that is set depending on the speed of the host vehicle M, the speed of the object, a road situation, and the like. The transition condition C may include that the speed of the host vehicle M is lower than a predetermined speed.

For example, the determiner 120 determines that the transition to the narrow road passage mode occurs when another vehicle m1 stopping in front of the host vehicle M while waiting for a right turn or a left turn is recognized and there is no adjacent lane on the left side of a lane in which the host vehicle M (or the other vehicle m1) travels, as shown on the road RD8 in FIG. 2. The determiner 120 determines that the transition to the narrow road passage mode occurs when the other vehicle m1 is stopping while waiting for a left turn and there is no adjacent lane on the right side of the lane in which the host vehicle M is traveling, or when the adjacent lane is present but is under construction, or when there is no space for the host vehicle M to enter due to a line of vehicles.

When transition to the narrow road passage mode has occurred, the HMI controller 140 causes the image imitating the host vehicle M to be displayed, and causes a direction in which the host vehicle M should travel to be displayed and the image for prompting the occupant to perform a steering operation to be displayed when there is an object around the host vehicle M. For example, the HMI controller 140 causes an image for assisting driving for passing along the narrow road so that the host vehicle does not come into contact with the other vehicles m1 and m2 present around the host vehicle M in a scene indicated by the road RD7 or the road RD8 to be displayed on the display device 32. The driving controller 130 may execute steering control or speed control for avoiding contact with the other vehicles m1 and m2. The driving controller 130 may perform control to guide the occupant to perform a steering operation for avoiding contact between the host vehicle M and an object. In this case, the driving controller 130 performs an operation for guiding the occupant to perform steering by using the reaction force to the steering wheel operated by the occupant.

A condition for returning from the narrow road passage mode to the normal mode (return condition C) is, for example, that a width of the road on which the host vehicle M travels is equal to or greater than a predetermined value. The return condition C may include a case in which the host vehicle M and the other vehicle m1 pass each other and then are separated by a predetermined distance or more, or a case in which the speed of the host vehicle M is equal to or higher than a predetermined speed. Further, the return condition C may include a case in which the minimum width of the area recognized as the area in which the host vehicle M can travel is equal to or greater than the predetermined value (for example, a case in which, when the host vehicle M tries to pass by a vehicle waiting for a right turn and the narrow road passage mode is activated, the vehicle waiting for a right turn completes the right turn, and the area in which the host vehicle M can travel increases and the minimum width becomes equal to or greater than the predetermined value).

<Emergency Avoidance Mode>

A condition for transition from the normal mode to the emergency avoidance mode (transition condition D) is, for example, a case in which the time to collision TTC between the host vehicle M and an object present near the host vehicle M is smaller than the threshold value. When the driving controller 130 executes driving assistance such as forward collision warning (FCW) when the time to collision TTC between the host vehicle M and the object present near the host vehicle M is smaller than a first threshold value, or executes driving assistance such as collision mitigation braking system (CMBS) when the time to collision TTC is smaller than a second threshold value that is smaller than the first threshold value, the transition condition D may include that any driving assistance is executed.

When transition to the emergency avoidance mode has occurred, the HMI controller 140 causes the image imitating the host vehicle M to be displayed, causes an image showing a direction in which the host vehicle should travel with respect to the image imitating the host vehicle M to be displayed, and causes an area other than the direction in which the host vehicle M should travel around the image imitating the host vehicle M to be displayed in a background color different from those displayed in the first to fourth modes.

The HMI controller 140 causes an image for assisting driving for avoiding contact between the objects OB1 and OB2 such as bicycles entering in front of the host vehicle M and the host vehicle M as shown on the road RD9 in FIG. 2 to be displayed on the display device 32. The driving controller 130 may control one or both of the steering and the speed of the host vehicle M to perform driving control so that the host vehicle M does not come into contact with an object.

Further, the condition for returning from the emergency avoidance mode to the normal mode (return condition D) is, for example, a case in which the time to collision TTC between the host vehicle M and the object is equal to or greater than the threshold value. The return condition D may include a case in which the host vehicle M is not traveling at the intersection, the merging section, the narrow road, or the like.

[Images Displayed in Correspondence to Respective Modes]

Next, an example of images displayed in the respective modes described above will be described.

<Normal Mode: First Display Mode>

Figure 3:
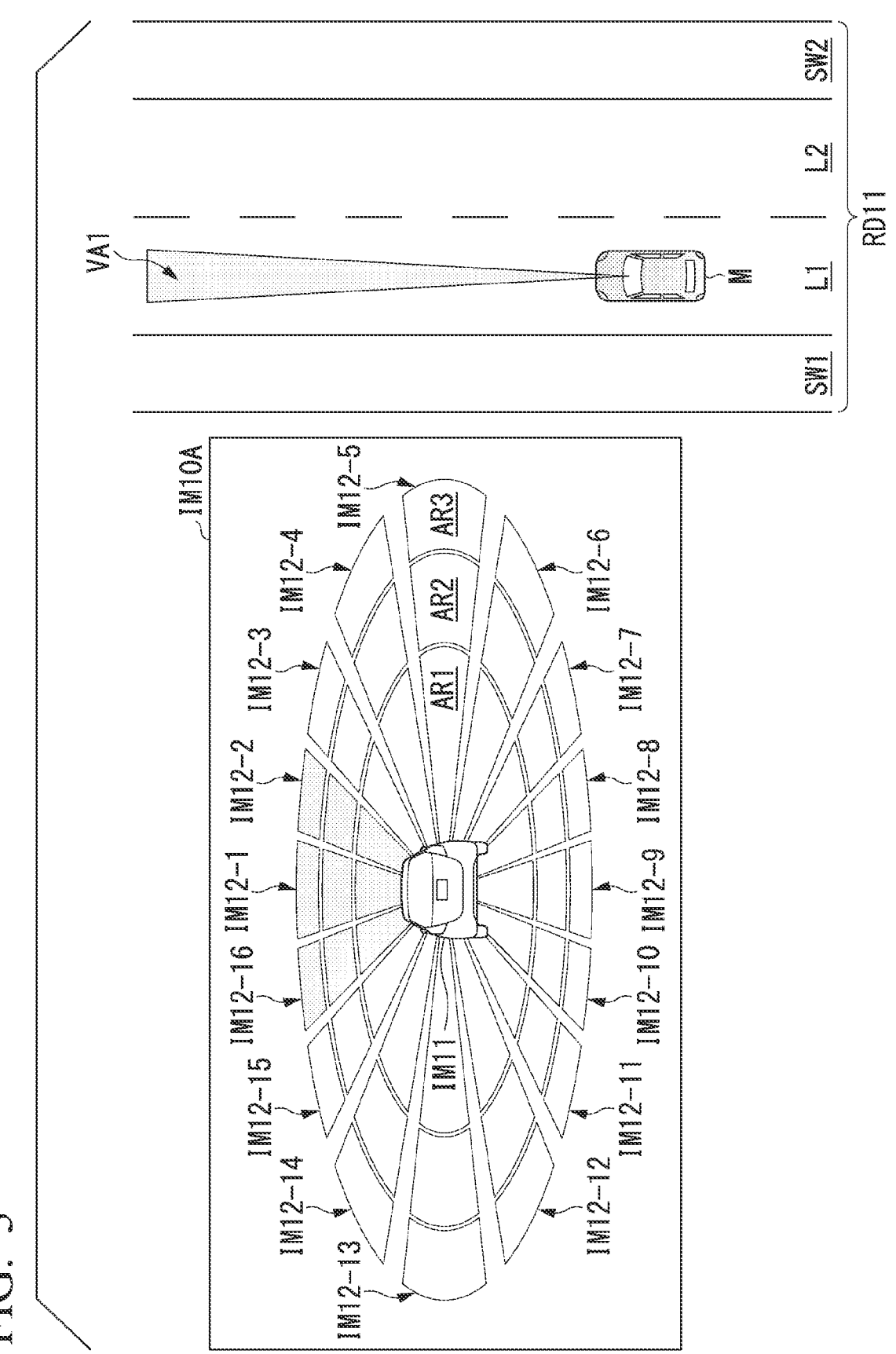
FIG. 3 is a diagram for describing a first display mode in a normal mode.

FIG. 3 is a diagram for describing the first display mode in the normal mode. In FIG. 3, an image IM10A generated by the HMI controller 140 and displayed on the display device 32 at the time of execution of the normal mode, and a traveling state of the host vehicle M in which content shown in the image IM10A is displayed are shown. Display content or layout included in the image IM10A is not limited thereto. The same applies to the description of the subsequent drawings.

In the example of FIG. 3, it is assumed that the host vehicle M is traveling on a road RD11 including lanes L1 and L2 and sidewalks SW1 and SW2 in an extension direction. An area VA1 indicates a line-of-sight direction of the occupant (driver) of the host vehicle M recognized by the recognizer 110.

When the normal mode is being executed, the HMI controller 140 generates the image IM10A including a first image IM11 imitating the host vehicle M, and second images (azimuth images) IM12-1 to IM12-16 obtained by dividing a surrounding (360 degrees) of the host vehicle M into 16 pieces according to a predetermined reference (for example, equal intervals). The first image IM11 in the normal mode is the image imitating the host vehicle M viewed from behind. Each of the second images IM12-1 to IM12-16 includes an area AR1 closest to the host vehicle M, an area AR3 farthest from the host vehicle M, and an area AR2 between the areas AR1 and AR3. The second images IM12-1 to IM12-16 are displayed in a predetermined background color (first background color).

The HMI controller 140 causes the second images IM12-1, IM12-2, and IM12-16 associated with a direction in which the host vehicle M can travel without the likelihood of contact with an object on the basis of the surroundings situation recognized by the recognizer 110 to be displayed in color different from the other second images IM12-3 to IM12-15 (first highlight color; for example, blue) when the host vehicle M is in a traveling state as shown in FIG. 3. This makes it easier for the occupant (driver) to recognize a direction in which the host vehicle M is unlikely to come into contact with an object.

<Normal Mode: Second Display Mode>

Figure 4:
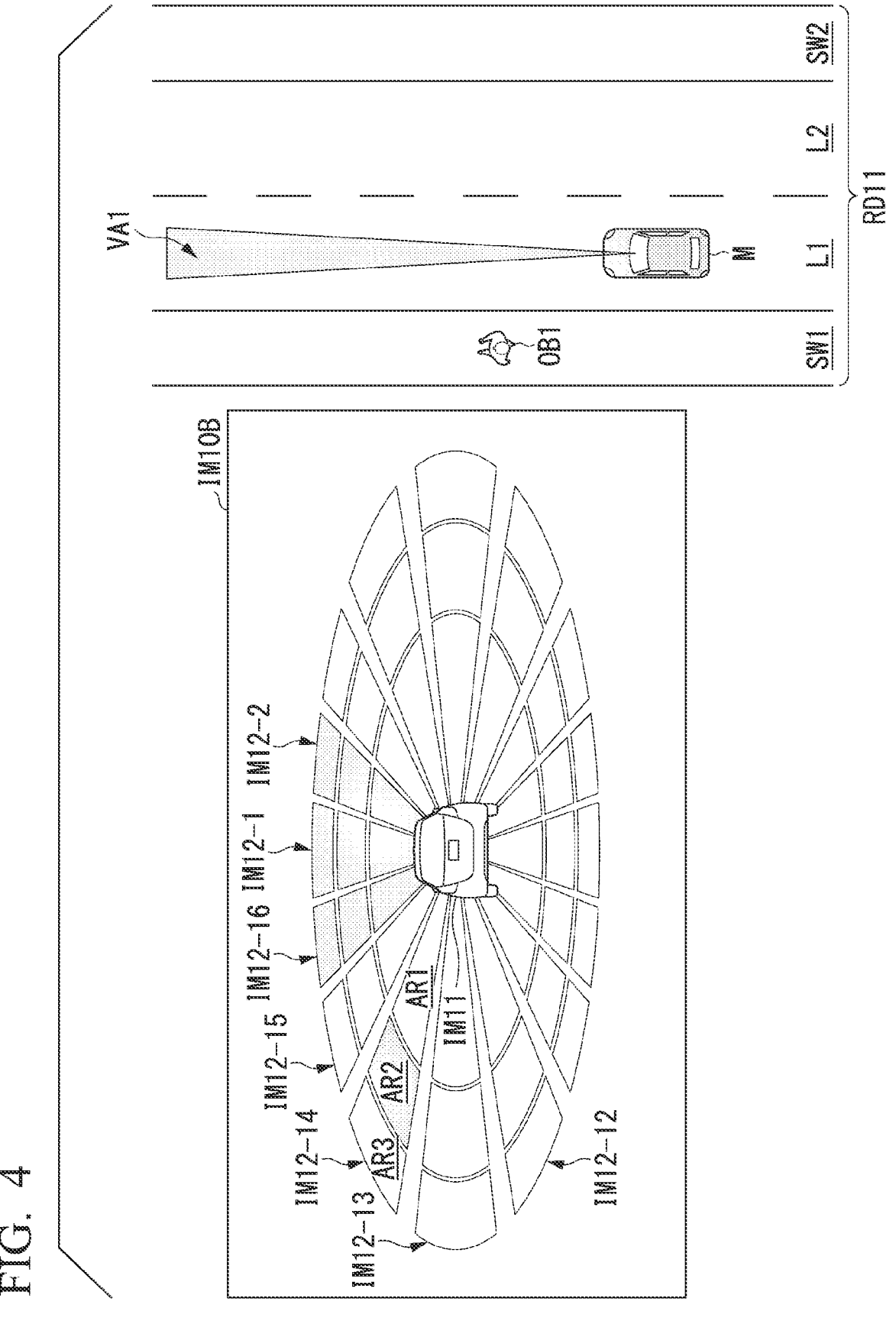
FIG. 4 is a diagram for describing a second display mode in the normal mode.

FIG. 4 is a diagram for describing a second display mode in the normal mode. In the example of FIG. 4, a traveling state differs from the traveling state shown in FIG. 3 in that the object (for example, a pedestrian) OB1 is present on the sidewalk SW1. The object OB1 is recognized as a pedestrian by the recognizer 110, and the pedestrian is less likely to enter the lane L1 from the sidewalk SW1. A relative distance between the host vehicle M and the object OB1 is equal to or greater than a predetermined distance. Therefore, the object OB1 is determined to be an object whose degree of approach to the host vehicle M is smaller than the threshold value. In this case, the HMI controller 140 generates an image IM10B in which the area AR2 corresponding to a distance to the host vehicle M among the areas AR1 to AR3 of the second image IM12-14 in a direction in which the object OB1 is present among the second images IM12-1 to IM12-16 is displayed in a color (second highlight color; green, for example) that can be distinguished from that of the other second images and the other areas, on the basis of a relative position of the object OB1 as viewed from the host vehicle M and the direction in which the object OB1 is present. In the example of FIG. 4, since a likelihood of the pedestrian OB1 entering the lane L1 from the sidewalk SW1 or a likelihood of the pedestrian OB1 coming into contact with the host vehicle M is low, an image showing the position of the object OB1 is displayed in a second highlight color that less highlights as compared to the first highlight color in association with a relative position of the object OB1 with respect to the host vehicle M.

<Normal Mode: Third Display Mode>

Figure 5:
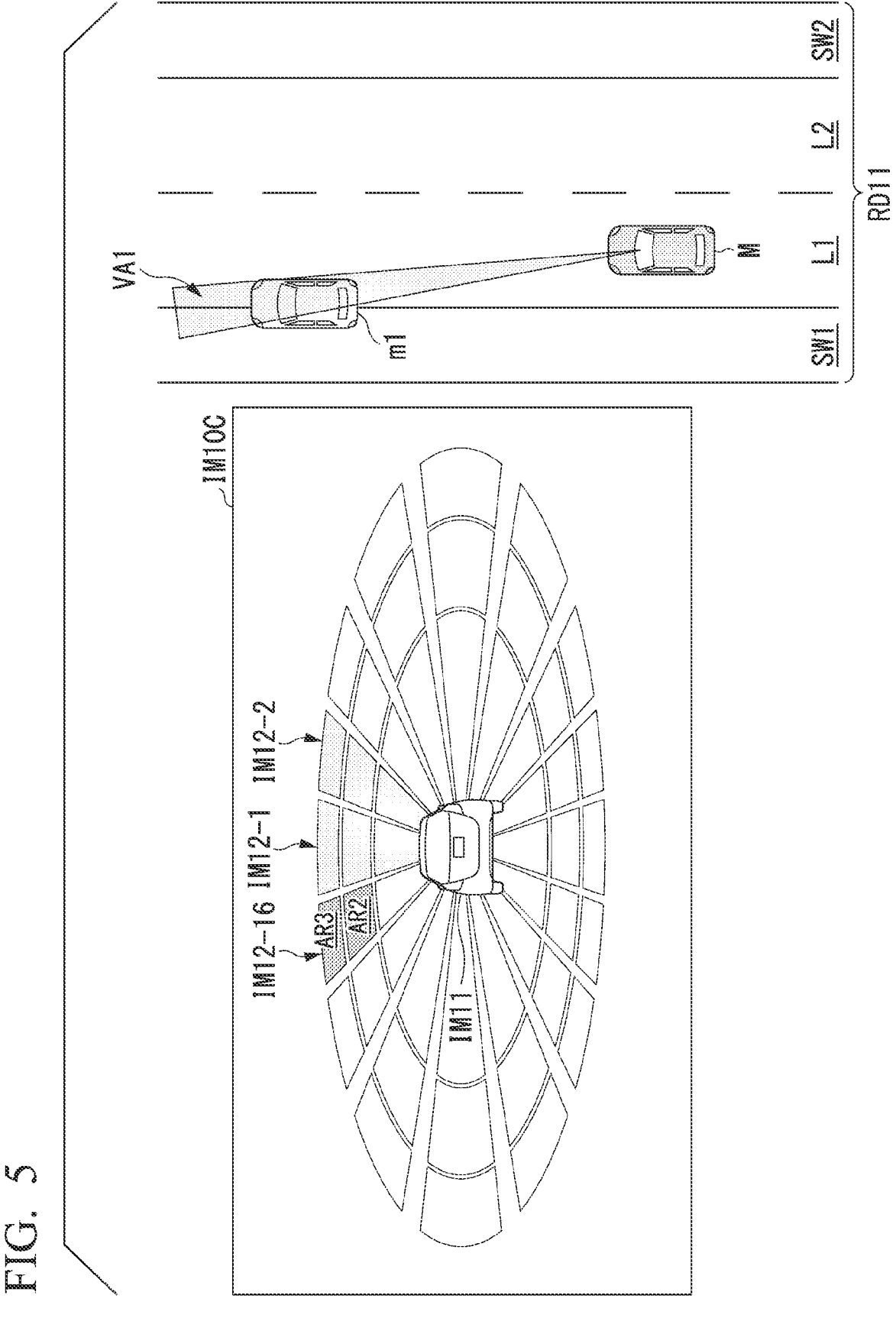
FIG. 5 is a diagram for describing a third display mode in the normal mode.

FIG. 5 is a diagram for describing a third display mode in the normal mode. In the example of FIG. 5, a display mode in a scene in which the other vehicle m1 is present in front of the host vehicle M on the lane L1 on which the host vehicle M travels, which is a scene in which a distance between the host vehicle M and the other vehicle m1 is equal to or greater than a predetermined distance, unlike the traveling state shown in FIG. 3, is displayed. In the example of FIG. 5, a scene in which another vehicle present in a direction of the second image IM12-16 is recognized on the basis of a recognition result of the recognizer 110 is shown.

In this case, the HMI controller 140 generates an image IM10C in which the second images IM12-1 and IM12-2 showing the direction in which the host vehicle M is unlikely to come into contact with an object among the second images IM12-1 to IM12-16 are displayed in the first highlight color, and the two areas AR2 and AR3 among the areas AR1 to AR3 of the second image IM12-16 corresponding to the direction of the other vehicle m1 when a line-of-sight direction of the occupant is a direction of the other vehicle m1 are displayed in a color (third highlight color: orange, for example) different from those of the second images IM12-1 to IM12-15. Since the other vehicle m1 is present on the lane L1 in which the host vehicle M travels, there is a likelihood that the other vehicle m1 will come into contact with the host vehicle M. Therefore, the two areas are displayed in the third highlight color, making it possible easier to call occupant's attention, unlike a case in which one area is displayed. In the third display mode, when the line-of-sight direction of the occupant is not the direction of the other vehicle m1, the HMI controller 140 causes the second image IM12 corresponding to the direction of the other vehicle m1 to be displayed in a fourth highlight color (for example, red), as shown in a sixth display mode of the normal mode, which will be described below.

<Normal Mode: Fourth Display Mode>

Figure 6:
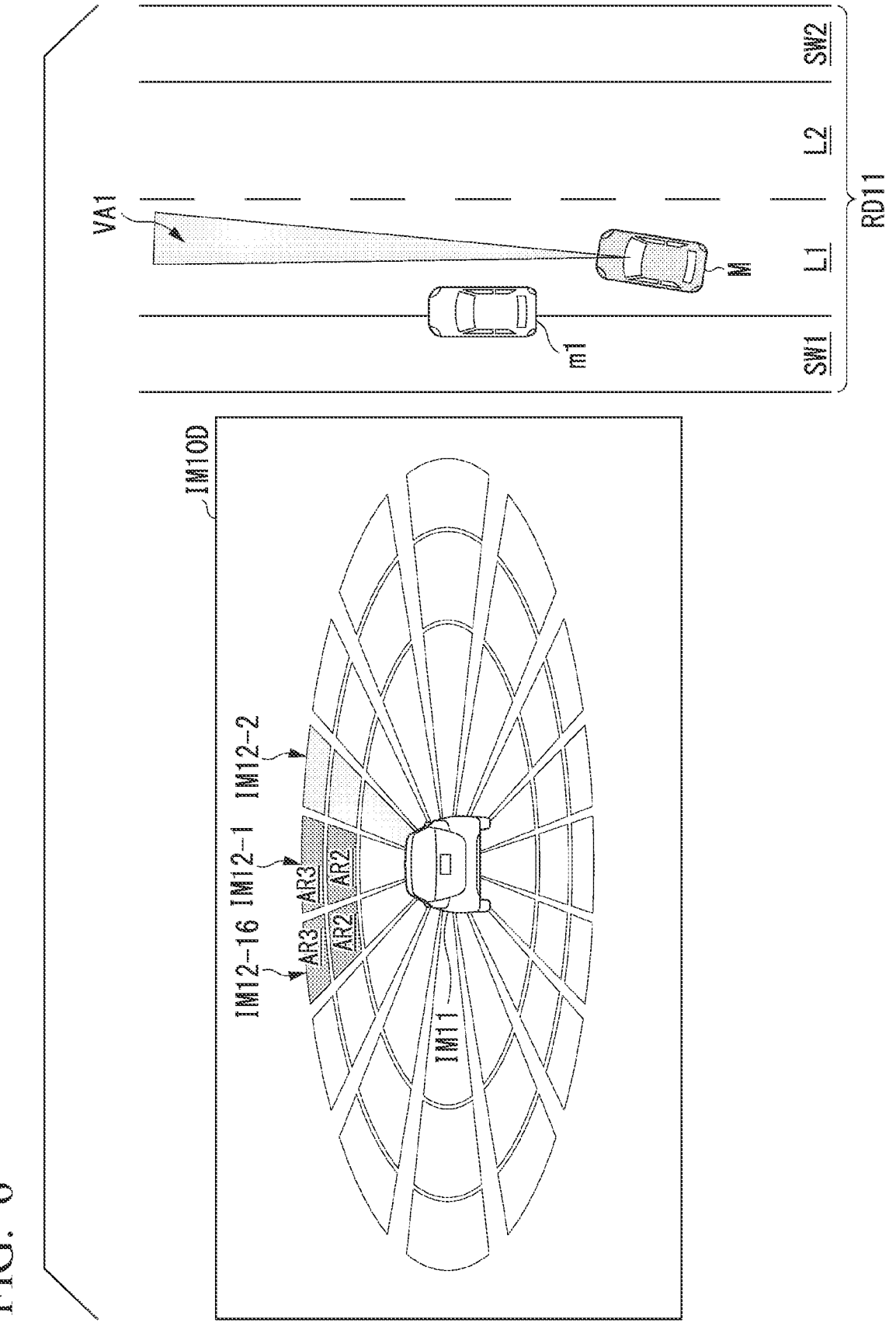
FIG. 6 is a diagram for describing a fourth display mode in the normal mode.

FIG. 6 is a diagram for describing a fourth display mode in the normal mode. In an example of FIG. 6, a scene in which an instruction for causing the host vehicle M to travel while being tilted to the right with respect to a direction in which the road RD11 extends in order for the host vehicle M to overtake the other vehicle m1 unlike the traveling state shown in FIG. 5 is displayed is shown. In the example of FIG. 6, it is assumed that a line-of-sight direction VA1 of the occupant of the host vehicle M is a direction in which the other vehicle m1 is not included. In the scene shown in FIG. 6, it is assumed that a degree of approach between the host vehicle and the other vehicle m1 is equal to or greater than the threshold value. In this case, the HMI controller 140 causes the second image IM12-2 corresponding to a course direction to which the host vehicle M should travel among the second images IM12-1 to IM12-16 to be displayed in the first highlight color. The course direction in which the host vehicle M should travel includes a direction in which the host vehicle M can travel with a likelihood of the host vehicle M coming contact with an object (contact risk) being smaller than a threshold value. The HMI controller 140 generates an image IM10D in which the two areas AR2 and AR3 among the areas AR1 to AR3 of images showing the direction that the occupant should watch, which are the second images IM12-16 and IM12-1 corresponding to the direction of the other vehicle m1 viewed from the host vehicle M, are displayed in the third highlight color. The number of areas displayed in the third highlight color increases as compared with the third display mode, making it possible to more clearly notify the occupant that the other vehicle m1 is approaching the host vehicle M, and of the direction that the occupant should watch. Since the scene shown in FIG. 6 is a scene after the occupant once recognizes the other vehicle m1, the "direction that the occupant should watch" may be read as a "direction to which the occupant should call attention".

<Normal Mode: Fifth Display Mode>

Figure 7:
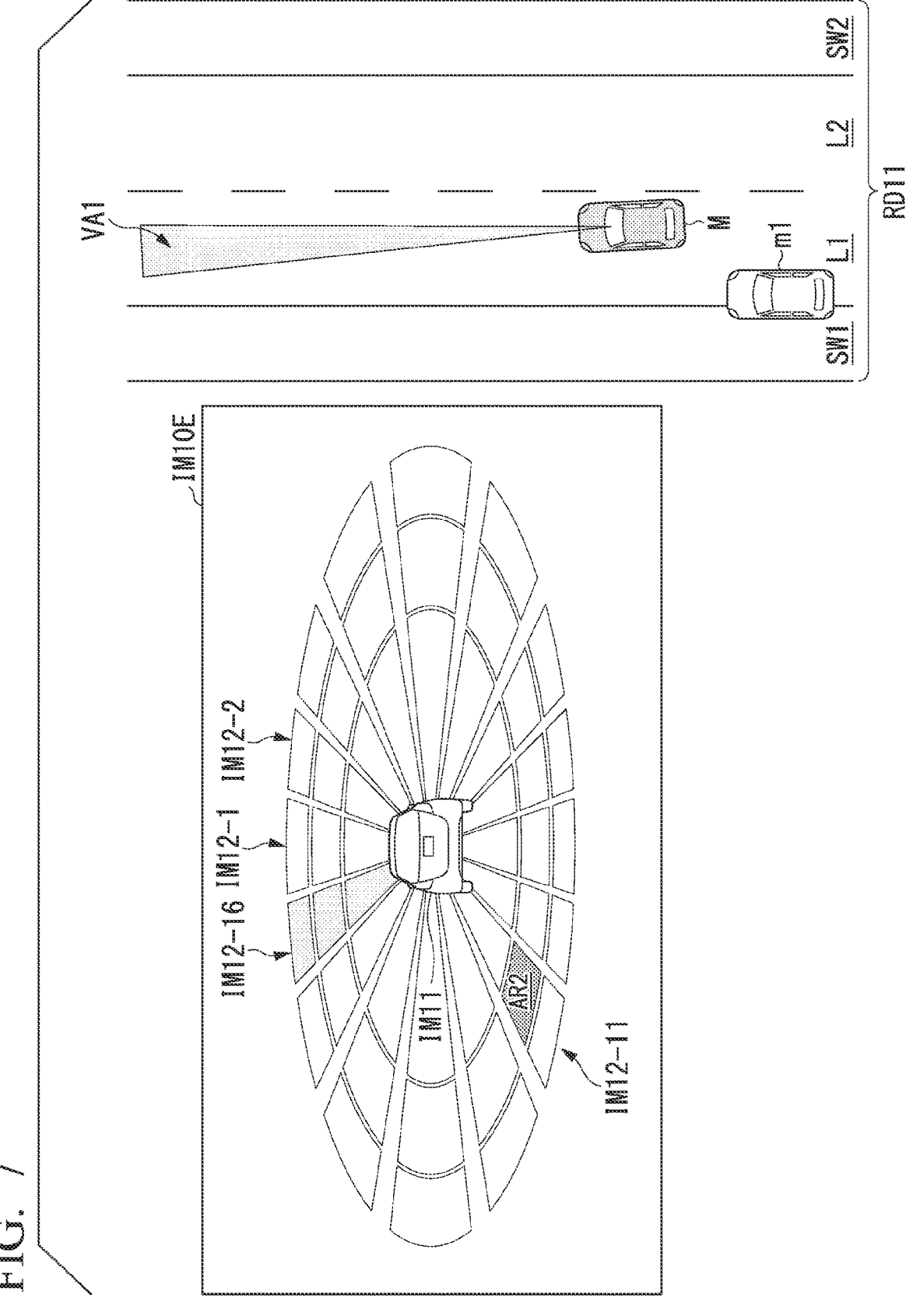
FIG. 7 is a diagram for describing a fifth display mode in the normal mode.

FIG. 7 is a diagram for describing a fifth display mode in the normal mode. In the example of FIG. 7, a scene in which the host vehicle M overtakes the other vehicle m1 and then indicates a direction for movement to a center of the lane L1 unlike the traveling state shown in FIG. 6 is shown. In the example of FIG. 7, it is assumed that the line-of-sight direction VA1 of the occupant of the host vehicle M is a direction in which the other vehicle m1 is not included.

In this case, the HMI controller 140 generates an image IM10E in which the second image IM12-16 corresponding to the direction in which the host vehicle M should travel among the second images IM12-1 to IM12-16 is displayed in the first highlight color, and one area AR2 set according to the distance between the host vehicle M and the other vehicle m1 among the areas AR1 to AR3 of the second image IM12-11 corresponding to the direction in which the other vehicle m1 is present as viewed from the host vehicle M is displayed in a third highlight color. In the fifth display mode, since the host vehicle M has already overtaken the other vehicle m1, a likelihood of contact between the host vehicle M and the other vehicle m1 is low (the degree of approach is smaller than the threshold value). Therefore, the HMI controller 140 causes only one area AR2 corresponding to a position of the other vehicle m1 among the areas AR1 to AR3 of the second image IM12-11 to be displayed in the third highlight color. This makes it possible for the occupant to easily ascertain that the likelihood of the contact between the host vehicle M and the other vehicle m1 is low, but the other vehicle m1 is present near the host vehicle M.

<Normal Mode: Sixth Display Mode>

Figure 8:
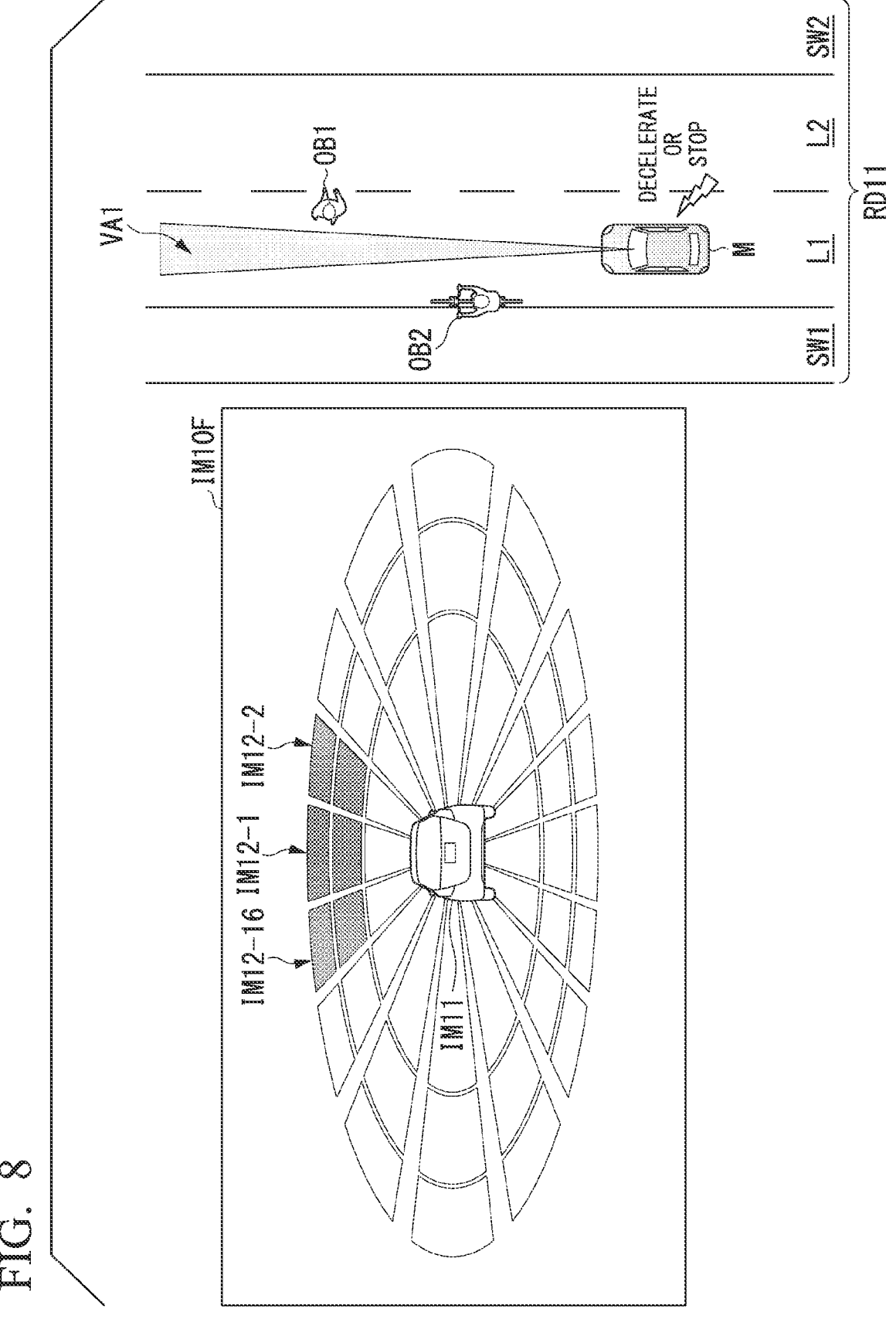
FIG. 8 is a diagram for describing a sixth display mode in the normal mode.

FIG. 8 is a diagram for describing the sixth display mode in the normal mode. In the example of FIG. 8, a scene in which the other objects OB1 and OB2 are present nearby in the traveling direction (the line-of-sight direction VA1) of the host vehicle M. The other objects OB1 and OB2 are, for example, traffic participants such as pedestrians or bicycles. The other objects OB1 and OB2 move in the lane L1 in which the host vehicle M travels and are present within the predetermined distance from the host vehicle M. Therefore, the driving controller 130 determines that the degree of approach between the other objects OB1 and OB2 and the host vehicle M is equal to or greater than the threshold value.

In this case, the HMI controller 140 generates an image IM10F in which the areas AR2 and AR3 displayed in two areas of the host vehicle M and the other objects OB1 and OB2 among the areas AR1 to AR3 in the images showing a direction that the occupant should watch among the second images IM12-1 to IM12-16, which are the second images IM12-1, IM12-2, and IM12-16, are displayed in a color (the fourth highlight color: red, for example) different from those of the other second images. The fourth highlight color is a color that further highlights as compared to the first to third highlight colors. This makes it possible to notify the occupant of directions in which there are the objects OB1 and OB2 that are highly likely to come into contact with the host vehicle M and should be watched by the occupant.

The driving controller 130 may execute speed control such as causing the host vehicle M to decelerate or stop, in addition to causing the image 10F described above to be displayed, in the scene shown in FIG. 8. In this case, the driving controller 130 may release the deceleration or stop control when a distance between the host vehicle M and the objects OB1 and OB2 is equal to or greater than a predetermined distance, or when the objects OB1 and OB2 have moved to positions other than the lane L1.

<Intersection Mode: First Display Mode>

Figure 9:
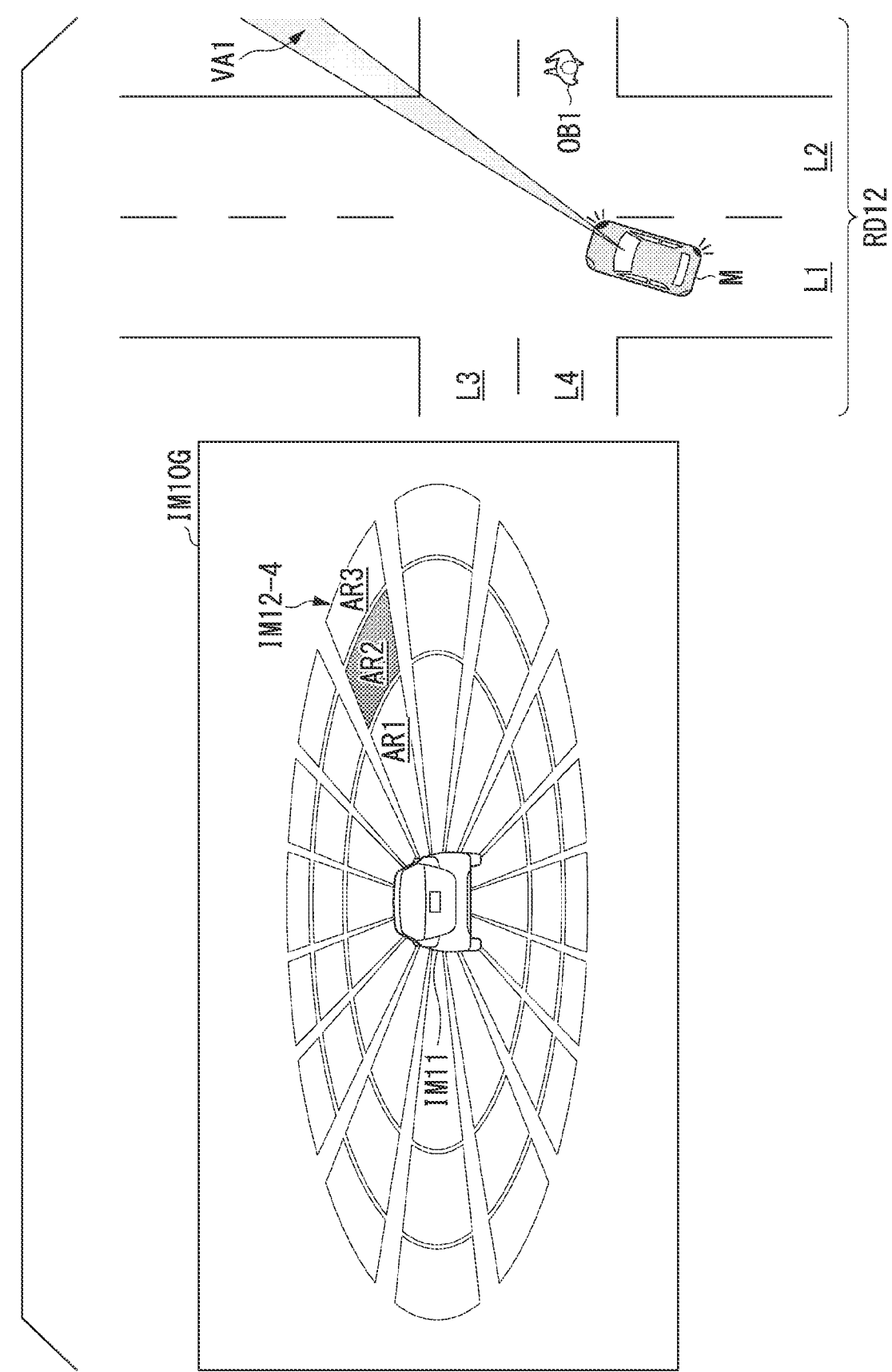
FIG. 9 is a diagram for describing a first display mode in an intersection mode.

FIG. 9 is a diagram for describing a first display mode in the intersection mode. In the example of FIG. 9, a scene in which the host vehicle M travels on a road RD12 near an intersection at which lanes L1 and L2 and lanes L3 and L4 intersect, which is a scene in which the host vehicle M turns right from the lane L1 to the lane L3 is shown. In the example of FIG. 9, it is assumed that an object OB1 present near the intersection in the line-of-sight direction VA of the occupant is not included, and the determiner 120 determines that the host vehicle M and the object OB1 are likely to come into contact with each other on the basis of relative distances, relative speeds, and moving directions thereof.

When the host vehicle M travels near the intersection in the intersection mode, the HMI controller 140 generates an image IM10G in which the second image IM12 corresponding to the line-of-sight direction VA1 is not highlighted and the second image IM12-4 corresponding to a position in which the object OB1 is present with respect to the host vehicle M is displayed in the fourth highlight color so that the object OB1 present around the host vehicle M is particularly easily recognized. In the example of FIG. 9, only the area AR2 of the second image IM12-4 is displayed in the fourth highlight color on the basis of the relative distance between the host vehicle M and the object OB1, but the area AR1 or the area AR3 may be displayed in the fourth highlight color according to the relative distance. Since this makes it possible for the occupant to be notified of the presence of the object nearby in the traveling direction, it is possible to cause the line of sight of the occupant to be guided in a direction in which the occupant should watch, and to cause the occupant to easily recognize the object OBE <Intersection Mode: Second Display Mode>

Figure 10:
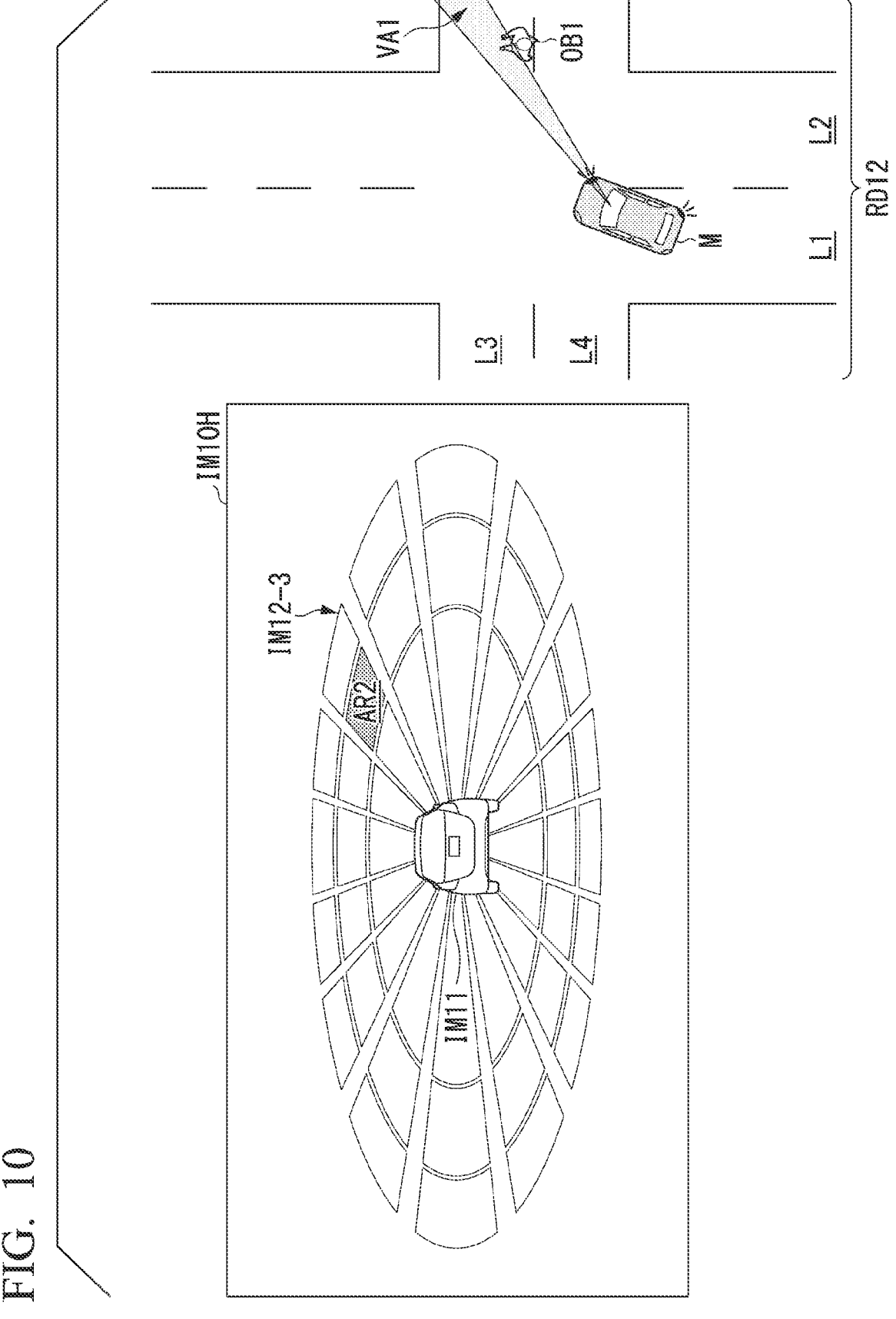
FIG. 10 is a diagram for describing a second display mode in the intersection mode.

FIG. 10 is a diagram for describing a second display mode in the intersection mode. In the example of FIG. 10, the second display mode is different from the first display mode shown in FIG. 9 in that the object OB1 is included in the line-of-sight direction of the occupant. In this case, the HMI controller 140 generates an image IM10H for displaying the second image IM12-3 corresponding to the position in which the object is present in the third highlight color having a lower degree of highlighting than the fourth highlight color.

In the example of FIG. 10, only the area AR2 of the second image IM12-3 according to the position of the object OB1 as viewed from the host vehicle M is displayed in the third highlight color on the basis of a relative distance between the host vehicle M and the object OBE The HMI controller 140 may display the area AR1 and the area AR3 of the second image IM12-3 in the third highlight color when the relative distance is smaller than a predetermined distance.

<Merging Mode: First Display Mode>

Figure 11:
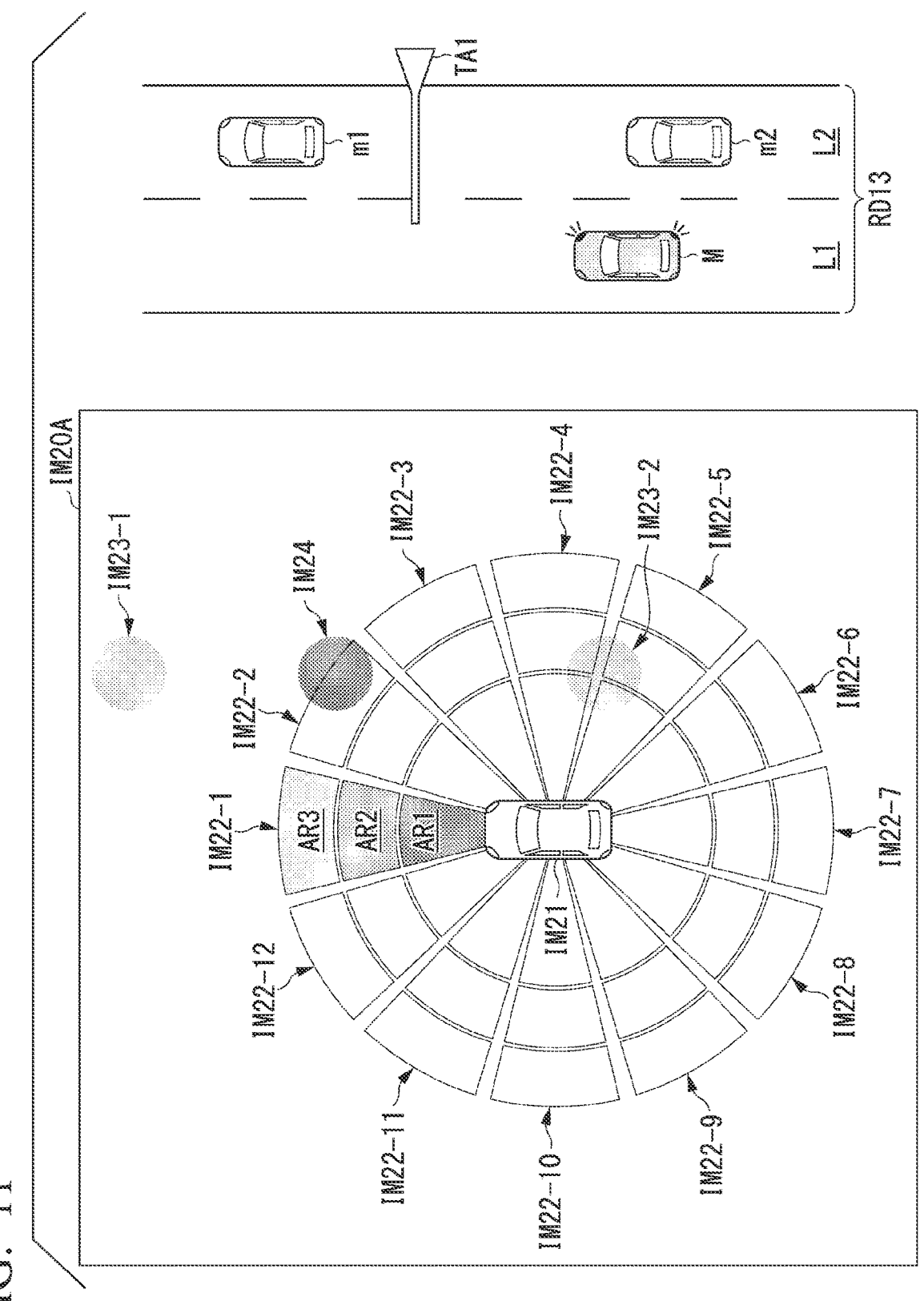
FIG. 11 is a diagram for describing a first display mode in a merging mode.

FIG. 11 is a diagram for describing a first display mode in the merging mode. In the example of FIG. 11, a scene in which the host vehicle M performs lane change from a lane L1 to a lane L2 on a road RD13, which includes the lanes L1 and L2 in which the host vehicle M can travel in the traveling direction, is shown. In the example of FIG. 11, it is assumed that other vehicles m1 and m2 are traveling on the lane L2, which is a lane change destination of the host vehicle M.

In this case, the driving controller 130 derives a relative speed and relative position between the host vehicle M and each of the other vehicles m1 and m2, and sets a target position that is the lane change destination of the host vehicle M on the basis of the derived relative speed and relative position. The driving controller 130 causes the HMI controller 140 to generate an image for performing driving for movement to the target position without the host vehicle M contacting the other vehicles m1 and m2.

In the first display mode of the merging mode, the HMI controller 140 generates an image IM20A including a third image IM21 imitating the host vehicle M, fourth images (azimuth images) IM22-1 to IM22-12 obtained by dividing surroundings (360 degrees) of the host vehicle M into 12 pieces according to a predetermined reference (for example, equal intervals), fifth images IM23-1 and IM23-2 showing positions of other vehicles M, and a sixth image IM24 showing a target position TA1. The third image IM12 is the image imitating the host vehicle M viewed from above. Each of the fourth images IM22-1 to IM22-12 includes an area AR1 closest to the host vehicle M, an area AR3 farthest from the host vehicle M, and an area AR2 between the areas AR1 and AR3.

The fifth image IM23 and the sixth image IM24 only need to be displayed in an identifiable display mode. The fifth image IM23 is an example of the "image with first predetermined color", and the sixth image IM24 is an example of the "image with second predetermined color". The fifth image IM23 and the sixth image IM24 are displayed side by side at positions on the lane change side of the host vehicle M with respect to the third image imitating the host vehicle M, and at least a part thereof may be displayed to be superimposed on the fourth image IM22. In the merging mode, the fourth image IM22 includes information indicating the acceleration or deceleration of the host vehicle M.

In the merging mode, the fifth images IM23-1 and IM23-2 showing the positions of the other vehicles M and the sixth image IM24 indicating the target position TA1 are displayed with reference to the position of the third image IM21 imitating the host vehicle M, making it possible for the occupant to easily recognize the current target position TA1 with respect to the host vehicle M.

In the example of FIG. 11, the position of the host vehicle M is present behind the target position TA1 by a predetermined distance or more. Therefore, the HMI controller 140 generates an image for prompting the occupant to accelerate the host vehicle M. Specifically, the fourth image IM22-1 showing the front of the host vehicle M among the fourth images IM22-1 to IM22-12 is displayed in a color different from those of the other fourth images IM22-2 to IM22-12 to prompt the acceleration of the host vehicle M. In the example of FIG. 11, since the host vehicle M and the target position TA1 are separated by the predetermined distance or more, all the areas AR1 to AR3 of the fourth image IM22-1 are displayed in different colors to prompt a large acceleration. In the example of FIG. 11, the area AR1 is displayed in the darkest color, and the area AR2 and the area AR3 are displayed in gradually lighter colors, but the display mode is not limited thereto.

<Merging Mode: Second Display Mode>

Figure 12:
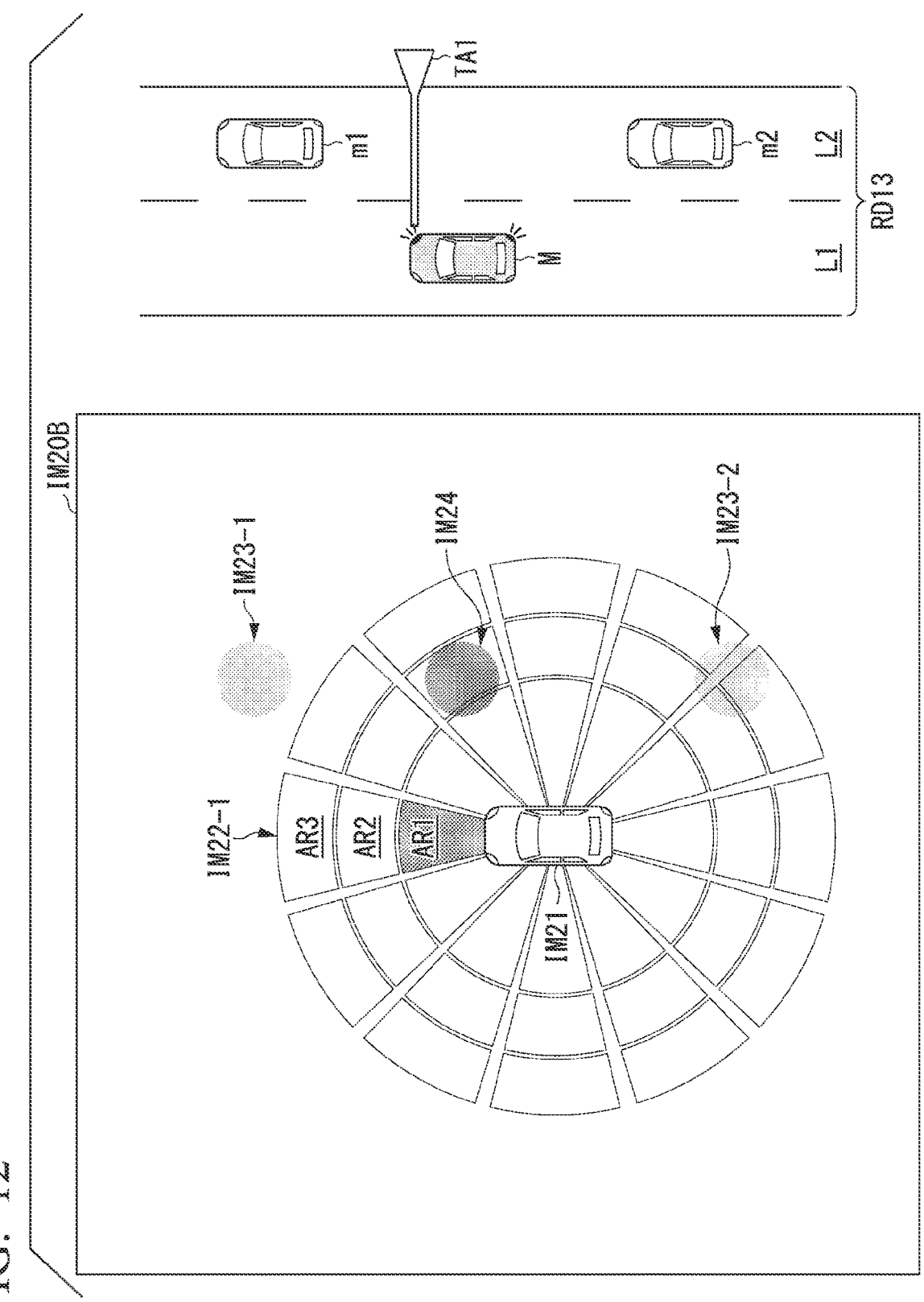
FIG. 12 is a diagram for describing a second display mode in the merging mode.

FIG. 12 is a diagram for describing a second display mode in the merging mode. In the example of FIG. 12, the position of the host vehicle M is closer to the target position than in the example of FIG. 11. In this case, the target position TA1 is still in front of the host vehicle M. Therefore, the HMI controller 140 generates an image IM20B in which only the area AR1 included in the fourth image IM22-1 showing the front of the host vehicle M is displayed in a color different from that of the other fourth images IM22-2 to IM22-12. This makes it possible to easily recognize that the host vehicle M is approaching the target position TA1 by using only a small amount of acceleration left, unlike the first display mode of FIG. 11.

<Merging Mode: Third Display Mode>

Figure 13:
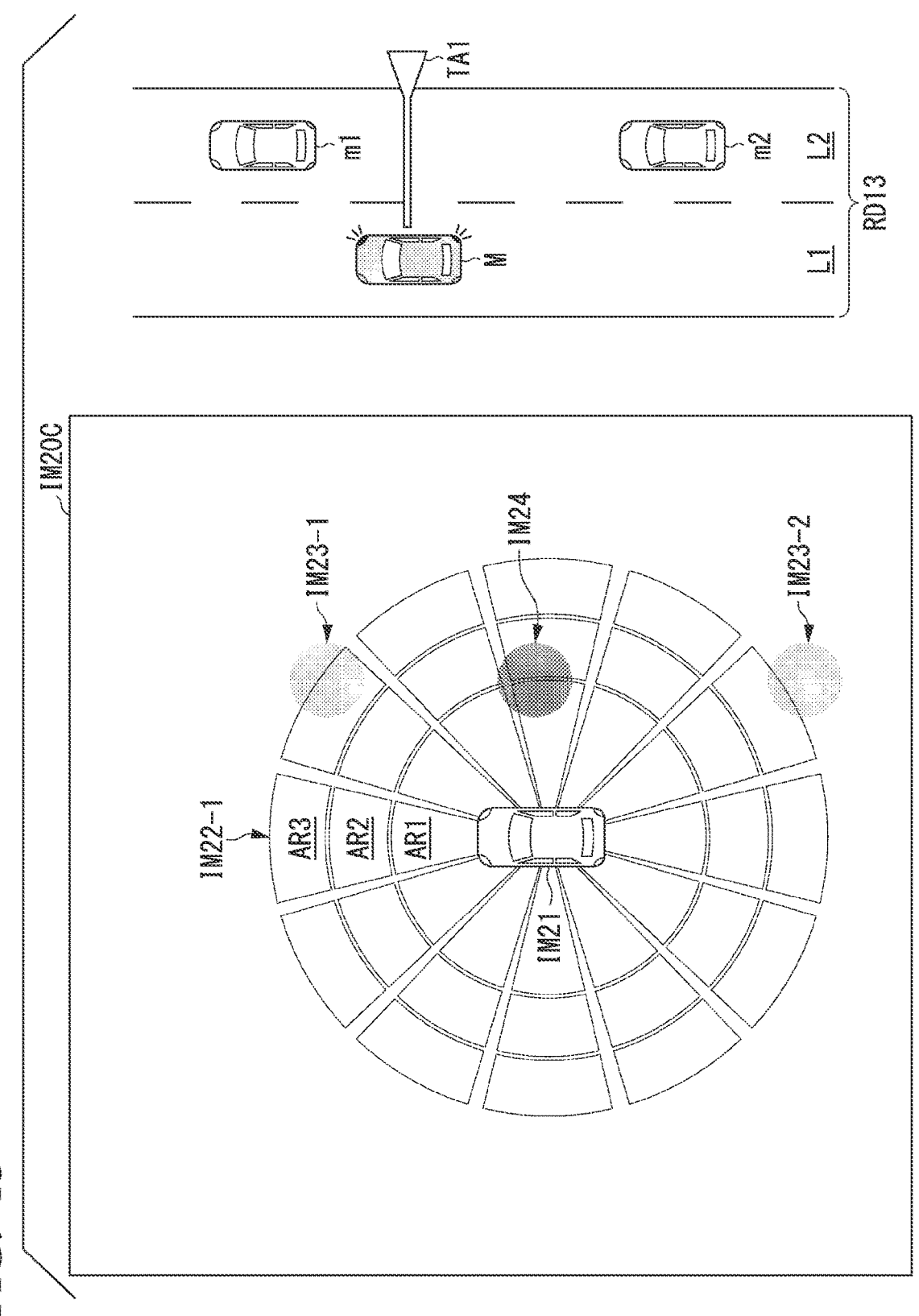
FIG. 13 is a diagram for describing a third display mode in the merging mode.

FIG. 13 is a diagram for describing a third display mode in the merging mode. In the example of FIG. 13, the target position is present beside the host vehicle M, unlike the example of FIG. 12. In this case, since addition acceleration of the host vehicle M is not required, the HMI controller 140 stops displaying the fourth image IM22-1 differently from the other images IM22-2 to IM22-12. This makes it possible for the occupant to easily ascertain that the host vehicle M is positioned beside the target position TA. Therefore, the occupant can position the host vehicle M at the target position by steering the host vehicle M and changing the lane of the host vehicle M from the lane L1 to the lane L2. When the display mode is brought to the third display mode shown in FIG. 13 (that is, when the position of the host vehicle M is positioned beside the target position TA1), the HMI controller 140 may cause the HMI 30 to output information (for example, an image or sound) for instructing the occupant to change lanes from the lane L1 to the lane L2. The driving controller 130 may add a torque reaction force for turning the steering wheel operated by the occupant of the host vehicle M to the right (does not turn the steering wheel to the left).

<Merging Mode: Fourth Display Mode>

Figure 14:
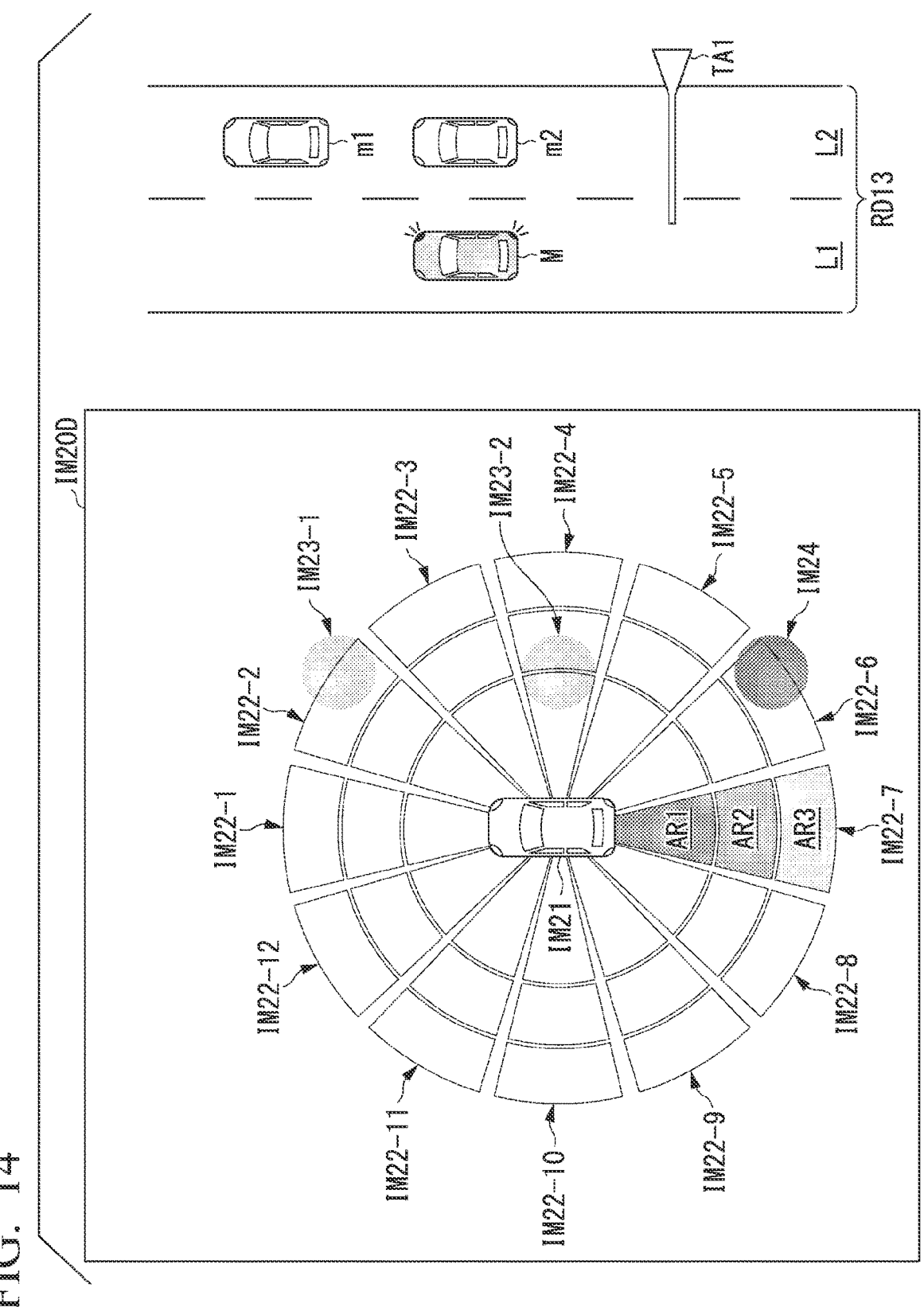
FIG. 14 is a diagram for describing a fourth display mode in the merging mode.

FIG. 14 is a diagram for describing a fourth display mode in the merging mode. In the example of FIG. 14, a case in which the target position TA1 with respect to the host vehicle M is behind the host vehicle M by a predetermined distance or more is shown, unlike the example of FIG. 11. In this case, the HMI controller 140 generates an image IM20D that is an image for prompting the occupant to decelerate the host vehicle M, and in which the areas AR1 to AR3 of the fourth image IM22-7 positioned behind the third image IM21 imitating the host vehicle M among the fourth images IM22-1 to IM22-12 are displayed in colors different from those of the other fourth images. The HMI controller 140 causes the fifth images IM23-1 and IM23-2 and the sixth image IM24 to be displayed side by side at positions on the lane change side of the third image IM21 imitating the host vehicle M is displayed, which are positions corresponding to a relative distance from the host vehicle M, in association with relative positions of the other vehicles m1 and m2 and the target position TA1 with respect to the host vehicle M.

This makes it possible for the occupant to easily ascertain from the image IM20D that the host vehicle M needs to decelerate in order to change lanes. The HMI controller 140 may reduce the number of areas to be highlighted in a predetermined color among the areas AR1 to AR3 as the relative distance between the host vehicle M and target position TA1 decreases. This makes it easier for the occupant to ascertain how much the vehicle is to be decelerated from a current speed (deceleration level).

<Narrow Road Passage Mode: First Display Mode>

Figure 15:
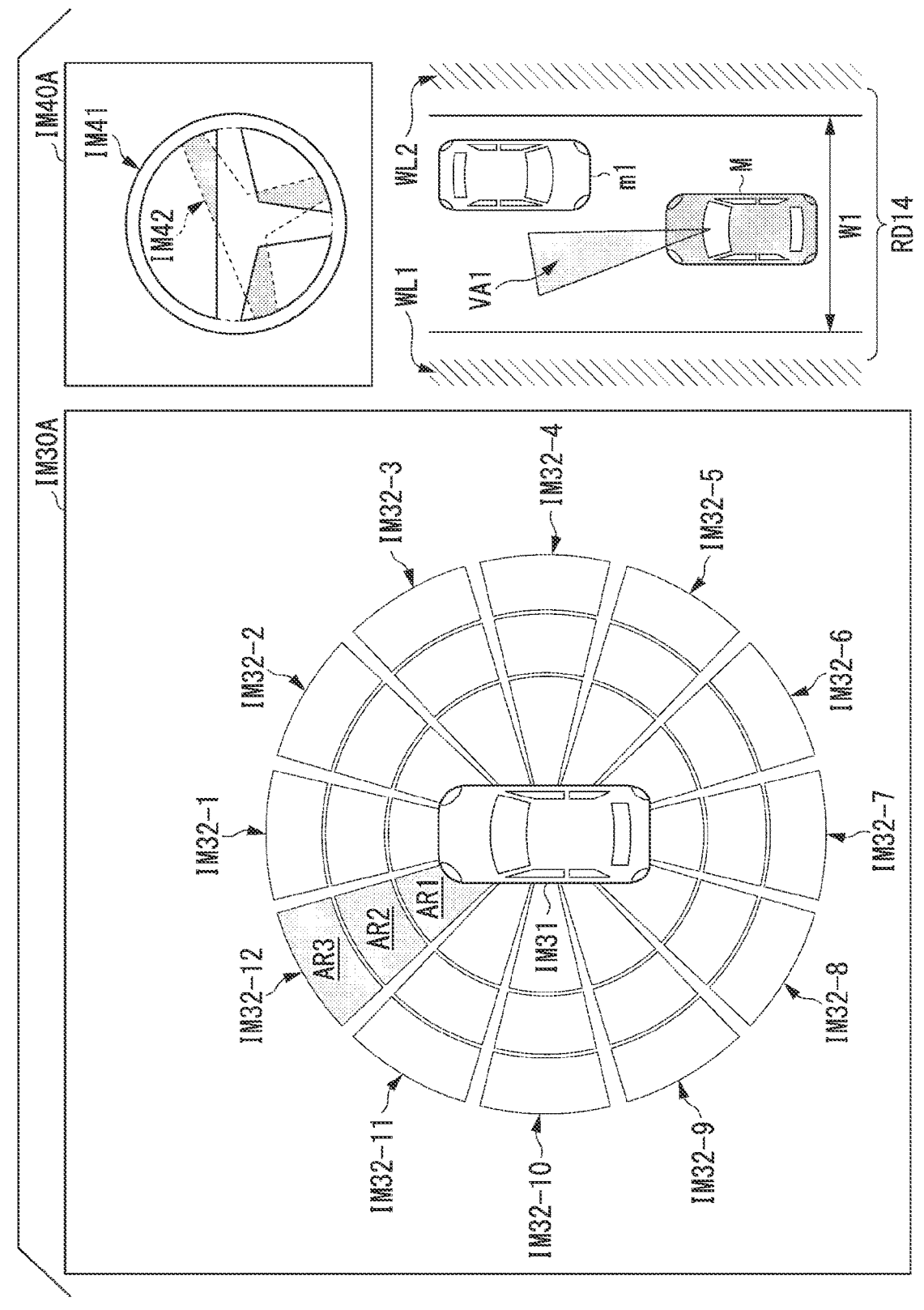
FIG. 15 is a diagram for describing a first display mode in a narrow road passage mode.

FIG. 15 is a diagram for describing a first display mode in the narrow road passage mode. In an example of FIG. 15, the host vehicle M traveling on a road RD14 determined to have a road width W1 smaller than a predetermined width and to be a narrow road, and another vehicle m1 traveling on the road RD14 while facing the host vehicle M are shown. In the example of FIG. 15, it is assumed that walls (examples of obstacles) WL1 and WL2 through which the vehicle cannot pass are present outside both edges of the road RD14.

In the first display mode of the narrow road passage mode, the HMI controller 140 generates an image IM30A including a seventh image IM31 imitating the host vehicle M and eighth images (azimuth images) IM32-1 to IM32-12 obtained by dividing the surroundings (360 degrees) of the host vehicle M into 12 pieces according to a predetermined reference (for example, equal intervals), and an image IM40A including images IM41 and IM42 imitating a steering wheel. The image IM40A is an example of the image for prompting the occupant to perform a steering operation. The seventh image IM31 is an image of the host vehicle M viewed from above similar to the third image IM31, but is an image larger than the third image IM21. In the narrow road passage mode, a situation farther from the host vehicle may not be regarded as an important situation since the host vehicle travels at a low speed, and a likelihood of contact with an object is high since the host vehicle travels in a narrower area. Therefore, the image (the seventh image IM31) imitating the host vehicle M in the display mode in the narrow road passage mode is displayed to be larger than the image (the third image IM21) imitating the host vehicle M in the merging mode, making it possible to more accurately ascertain a position of a nearby object or a direction in which the host vehicle M should travel, with reference to the host vehicle M, and call occupant's attention to the necessity of fine operations in a short-range area as compared to other modes.

Each of the eighth images IM32-1 to IM32-12 includes the three areas AR1 to AR3 described above. The image IM40A includes a first steering image IM41 that is displayed according to a current steering amount and steering direction of the host vehicle M, and a second steering image IM42 that is displayed according to a steering amount and steering direction according to a direction in which host vehicle M should travel. The HMI controller 140 may cause the images IM30A and IM40A to be displayed within a predetermined range, or may cause the images IM30A and IM40A to be displayed on different display devices when the host vehicle M includes a plurality of display devices 32.

In the example of FIG. 15, a determination is made that the host vehicle M is approaching the other vehicle m1 and is likely to come into contact with the other vehicle m1. Therefore, the HMI controller 140 cause all the areas AR1 to AR3 of the eighth image IM32-12 showing the direction in which the host vehicle M should travel among the eighth images IM32-1 to IM32-12 to be displayed in a color different from those of the eighth other images IM32-1 to IM32-12, so that the occupant moves the host vehicle M to the left side.

The HMI controller 140 causes the second steering image IM42 to be turned to the left relative to the first steering image IM41 and displayed in the image IM40A to cause the occupant to turn the steering wheel of the host vehicle M to the left. This makes it possible to prompt the occupant to turn the steering wheel of the host vehicle M to the left. Therefore, the occupant can turn the steering wheel to the left and easily ascertain an amount of turning (an amount of steering). In the narrow road passage mode, the driving controller 130 may perform control for guiding the occupant to perform a steering operation for avoiding contact between the host vehicle M and the other vehicle m1. In this case, the driving controller 130 performs an operation for guiding the occupant to perform steering so that the host vehicle M moves in the direction in which the host vehicle M should travel, by using the reaction force to the steering wheel operated by the occupant.

<Narrow Road Passage Mode: Second Display Mode>

Figure 16:
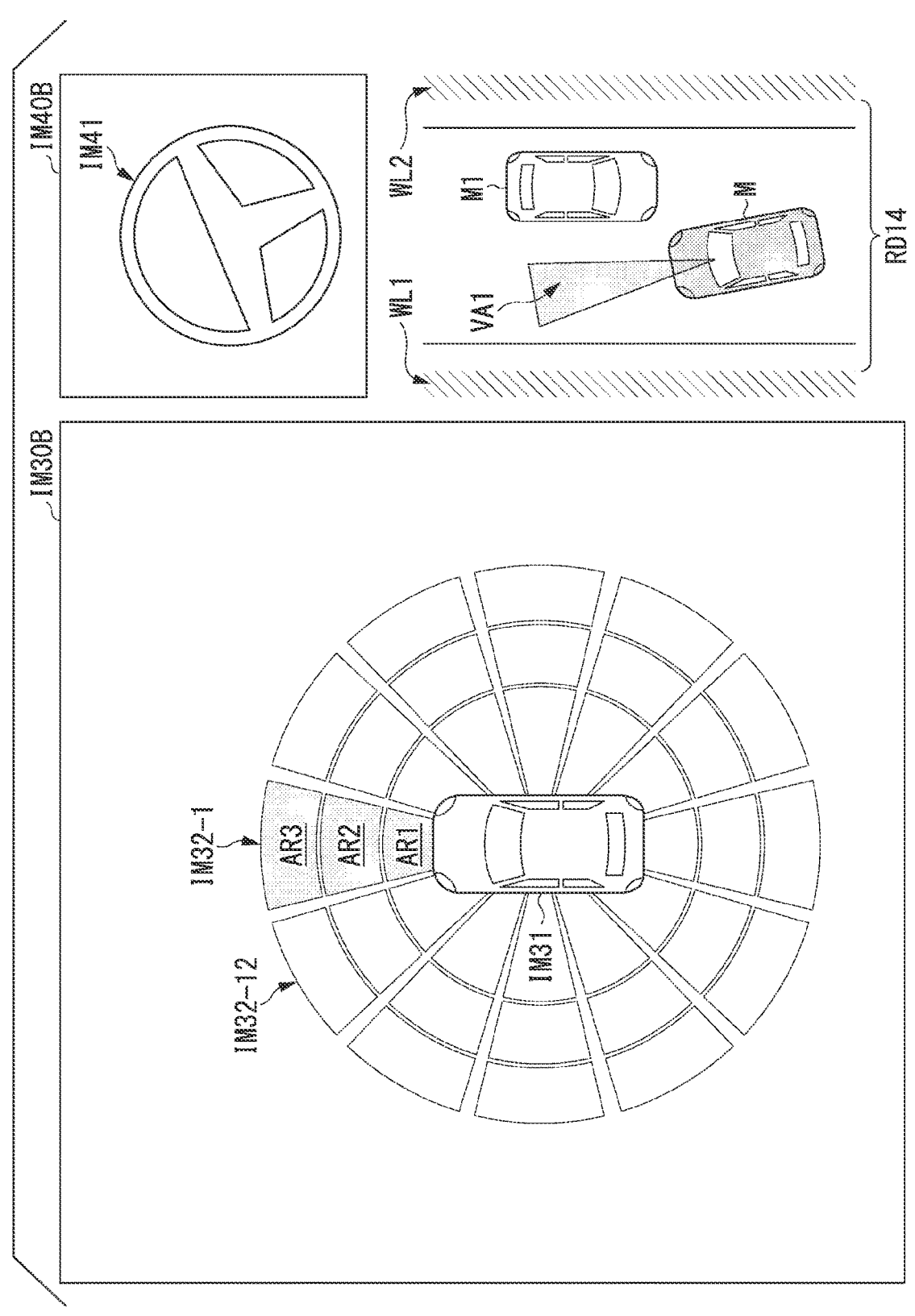
FIG. 16 is a diagram for describing a second display mode in the narrow road passage mode.

FIG. 16 is a diagram for describing a second display mode in the narrow road passage mode. In the example of FIG. 16, a scene differs from the scene shown in FIG. in that the host vehicle M moves to the left according to a steering operation of the occupant. In this case, an actual steering amount and steering direction of the steering wheel of the host vehicle M match a steering amount and steering direction of the steering wheel associated with the direction in which the host vehicle M should travel. Therefore, in the image IM40B generated by the HMI controller 140, only the first steering image IM41 is displayed because the first steering image IM41 is displayed to be superimposed on the second steering image IM42. In the image IM30B generated by the HMI controller 140, all the areas AR1 to AR3 of the eighth image IM32-1 corresponding to the line-of-sight direction of the occupant (the front side of the host vehicle M) are displayed in a different color from those of the other eighth images IM32-2 to IM32-12.

This makes it easier for the occupant to ascertain that the host vehicle M is traveling in a direction in which the host vehicle M does not come into contact with the other vehicle m1.

<Narrow Road Passage Mode: Third Display Mode>

Figure 17:
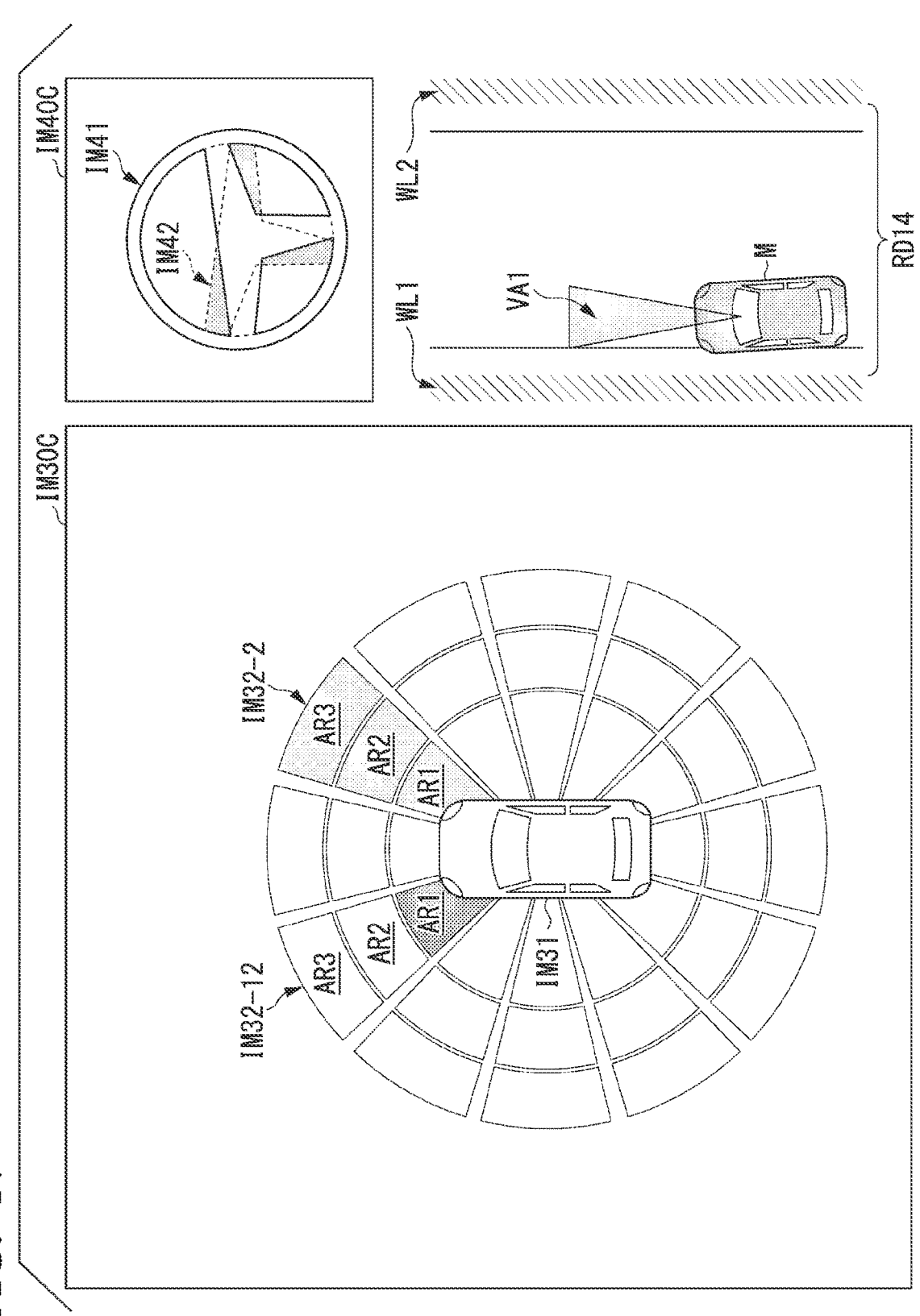
FIG. 17 is a diagram for describing a third display mode in the narrow road passage mode.

FIG. 17 is a diagram for describing a third display mode in the narrow road passage mode. A screen shown in FIG. 17 shows a scene in which the host vehicle M has moved to the left and passes another vehicle m1, but is approaching a wall WL1 present outside an edge portion of the road RD14 (a distance between the host vehicle M and the wall WL1 is smaller than a predetermined distance). In this case, the HMI controller 140 generates an image IM30C in which the area AR1 closer to the host vehicle M among the areas of an image showing a direction that the occupant should watch, which is the eighth image IM32-12 corresponding to a direction in which there is a wall viewed from the host vehicle M is displayed in a different color, and all the areas AR1 to AR3 of the eighth image IM32-2 showing the direction in which the host vehicle M should travel (specifically, a direction for avoiding contact between the host vehicle M and the wall WL1) are displayed in a color different from those of the other areas. The HMI controller 140 generates an image IM40C including the first steering image IM41 with a position of the entire steering wheel as a reference, and a second steering image 42 for turning the steering wheel in the direction in which the host vehicle M should travel.

Thus, the images IM30C and IM40C are displayed on the display device 32, making it possible to notify that the host vehicle M is approaching the wall WL1, and prompt the occupant to perform a steering operation with respect to the host vehicle M.

<Emergency Avoidance Mode: First Display Mode>

Figure 18:
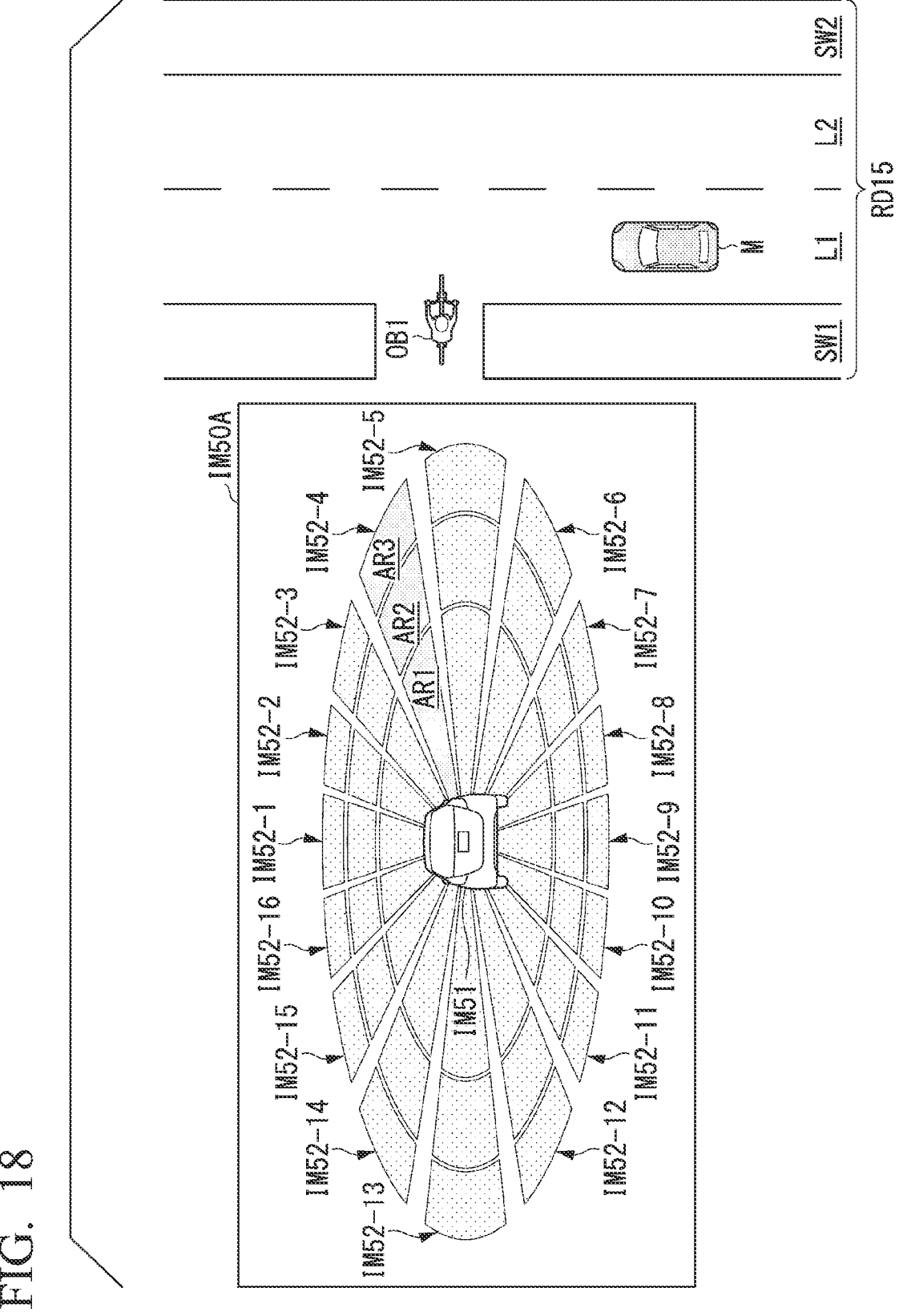
FIG. 18 is a diagram for describing a first display mode in an emergency avoidance mode.

FIG. 18 is a diagram for describing a first display mode in the emergency avoidance mode. FIG. 18 shows the host vehicle M traveling in a lane L1 of a road RD15 including lanes L1 and L2 and sidewalks SW1 and SW2, and an object (bicycle) OB1 entering the lane L1 from the sidewalk SW1. In an example of FIG. 18, it is assumed that the transition condition D for transition to the emergency avoidance mode is satisfied.

In the first display mode of the emergency avoidance mode, the HMI controller 140 generates an image IM50A including a ninth image IM51 imitating the host vehicle M, and tenth images (azimuth images) IM52-1 to IM52-16 obtained by dividing a circumference (360 degrees) of the host vehicle M into 16 pieces according to a predetermined reference (for example, equal intervals). The ninth image IM51 in the normal mode is the image imitating the host vehicle M viewed from behind, like the first image IM11. Each of the second images IM12-1 to IM12-16 includes the three areas AR1 to AR3, as described above.

In the case of the emergency avoidance mode, the HMI controller 140 causes all the areas AR1 to AR3 of the ninth image IM52-4 showing a direction for avoiding the contact between the host vehicle M and the object OB1 to be displayed in a different color from those of the other ninth images IM52-1 to IM52-3 and IM52-5 to IM52-16. The HMI controller 140 causes the ninth images IM52-1 to IM52-3 and IM52-5 to IM52-16 to be displayed in a second background color different from the first background color described above. The second background color is a color that further highlights as compared to the first background color. As shown in FIG. 18, the entire circumference of the host vehicle M is displayed in the second background color, making it possible for the occupant to easily ascertain that there is an object highly likely to come into contact with the host vehicle M.

In the emergency avoidance mode, the HMI controller 140 does not cause the image IM40 regarding the steering amount and steering direction of the steering wheel to be displayed, as in the narrow road passage mode. This makes it possible to suppress occupant's attention to driving being distracted, by a plurality of images being displayed.

[Processing Flow]

Figure 19:
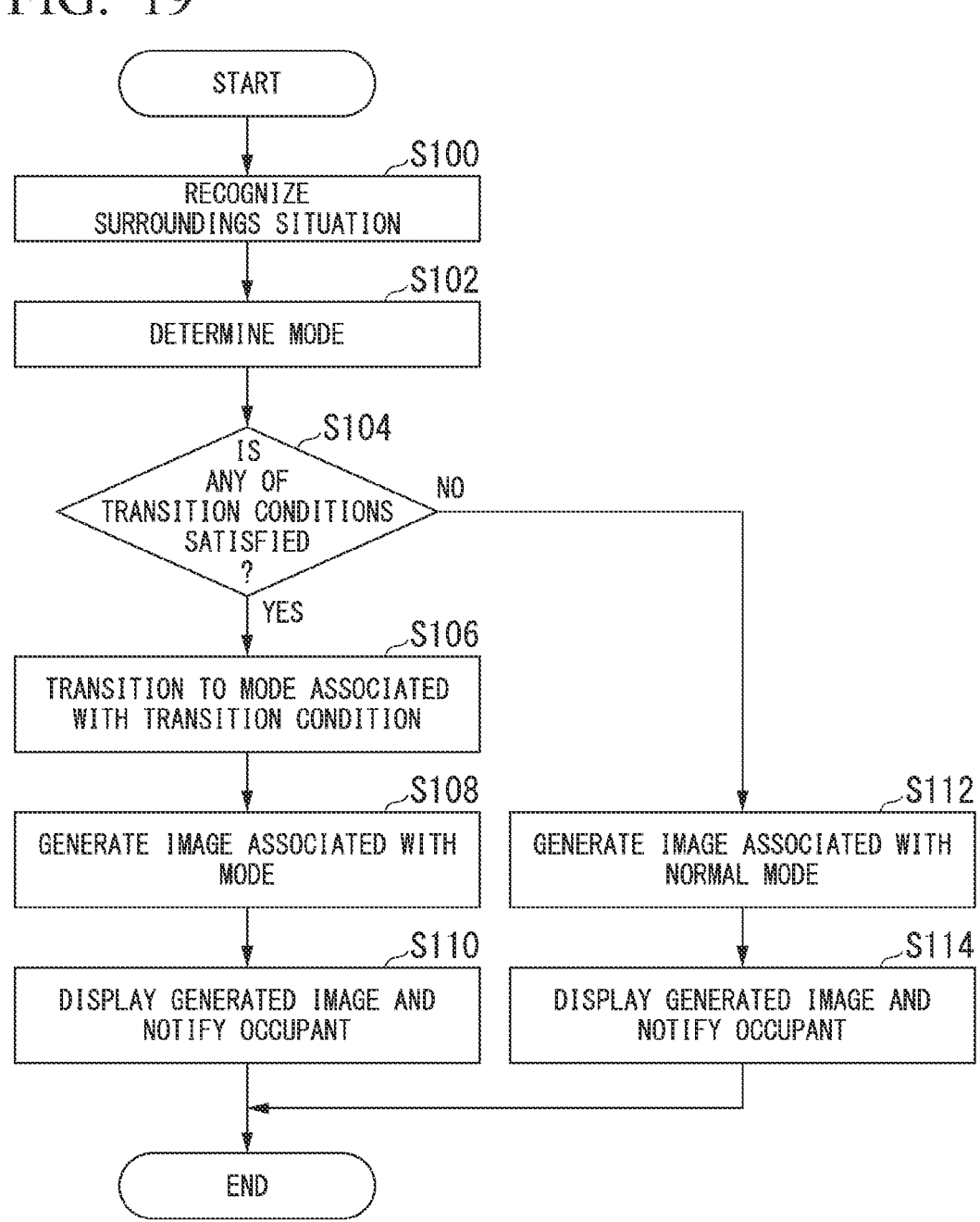
FIG. 19 is a flowchart showing an example of a flow of processing that is executed by the driving assistance device of the embodiment.

FIG. 19 is a flowchart showing an example of a flow of processing that is executed by the driving assistance device 100 of the embodiment. In the process of FIG. 19, image display processing according to the mode among the various processes executed by the driving assistance device 100 will be mainly described. The process of FIG. 19 may be repeatedly executed at a predetermined cycle or at a predetermined timing. It is assumed that a first mode in the processing of FIG. 19 is the normal mode (road traveling mode).

In the example of FIG. 10, the recognizer 110 recognizes the surroundings situation of the host vehicle M (step S100). Next, the determiner 120 performs processing for determining a mode in the traveling state of the host vehicle M on the basis of a recognition result of the recognizer 110 (step S102). For example, the determiner 120 determines whether or not any of transition conditions (for example, transition conditions A to D) associated with a plurality of preset modes is satisfied (step S104). When any transition condition is satisfied, the driving controller transitions to the mode associated with the transition condition (step S106). Next, the HMI controller 140 generates an image associated with the mode after the transition (step S108). The generated image is displayed on the display device 32 and the occupant is notified of the image (step S110).

In the processing of step S104, when a determination is made that any transition condition is not satisfied, the HMI controller 140 generates an image associated with the normal mode (step S112), and causes the generated image to be displayed on the display device 32 and the occupant to be notified of the generated image (step S114). Thus, the processing of the present flowchart ends.

In the processing of FIG. 19, when a condition of transition from the normal mode is satisfied, transition to a mode corresponding to the transition condition occurs and then, when a predetermined return condition is satisfied, return to the normal mode occurs. In this case, the HMI controller 140 generates an image in a display mode corresponding to the normal mode and causes the image to be displayed on the display device 32, thereby notifying the occupant.

<Modification Example>

In the display of each image described above, the HMI controller 140 may cause the image to be highlighted through adjustment of gradation, pattern, blinking, luminance, brightness, or the like instead of causing the image to be highlighted according to color.

According to the embodiment described above, the driving assistance device 100 includes the recognizer 110 configured to recognize a surroundings situation of a vehicle; the HMI controller (an example of a display controller) 140 configured to cause an image for assisting an occupant driving the vehicle to be displayed in a plurality of preset display modes on the display device; and the driving controller 130 configured to control a driving operation with respect to the vehicle by the occupant or traveling of the vehicle, wherein the plurality of display modes include display modes corresponding to at least a first mode in which the vehicle travels in a direction in which the road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects, the display controller causes transition to any one of the plurality of display modes to be performed on the basis of the surroundings situation recognized by the recognizer, and the display controller causes an image imitating the vehicle to be displayed when the display controller causes an image to be displayed in a display mode corresponding to the fourth mode, and causes a direction in which the vehicle should travel to be displayed and causes an image for prompting the occupant to perform a steering operation to be displayed when there is an object around the vehicle, thereby performing more appropriate driving assistance according to the surroundings situation.

The embodiment described above can be expressed as follows.

A driving assistance device includes a storage device that stores a program, and a hardware processor, wherein the hardware processor executes the program to:

recognize a surroundings situation of a host vehicle;

cause an image for assisting an occupant driving the vehicle to be displayed in a plurality of preset display modes on a display device; and execute driving control for controlling a driving operation with respect to the vehicle by the occupant or traveling of the vehicle, the plurality of display modes including display modes corresponding to at least a first mode in which the vehicle travels in a direction in which the road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects;

cause transition to any one of the plurality of display modes to be performed on the basis of the recognized surroundings situation;

cause an image imitating the vehicle to be displayed when the display controller causes an image to be displayed in a display mode corresponding to the fourth mode; and cause a direction in which the vehicle should travel to be displayed and cause an image for prompting the occupant to perform a steering operation to be displayed when there is an object around the vehicle.

While forms for carrying out the present invention have been described using the embodiments, the present invention is not limited to these embodiments at all, and various modifications and substitutions can be made without departing from the gist of the present invention.

What is claimed is:

1. A driving assistance device comprising:

a recognizer configured to recognize a surroundings situation of a vehicle;

a display controller configured to cause an image for assisting an occupant driving the vehicle to be displayed in a plurality of preset display modes on a display device; and a driving controller configured to control a driving operation with respect to the vehicle by the occupant or traveling of the vehicle, wherein the plurality of display modes include display modes corresponding to at least a first mode in which the vehicle travels in a direction in which a road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects, the display controller causes transition to any one of the plurality of display modes to be performed on the basis of the surroundings situation recognized by the recognizer, and the display controller when the display controller causes the image to be displayed in a display mode corresponding to the fourth mode, causes a first image of a group of images that imitates the vehicle to be displayed, and when there is an object around the vehicle, causes a direction in which the vehicle should travel to be displayed and causes a second image of the group of images that prompts the occupant to perform a steering operation to be displayed, wherein the display controller selects the image to be displayed, from among at least the first image of the group of images, a third image of the group of images that shows a position of the object around the vehicle, a fourth image of the group of images that show the direction in which the vehicle should travel, a target position serving as a lane change destination of the vehicle, a fifth image of the group of images that actuates acceleration or deceleration, and the second image prompts the occupant to perform a steering operation on the basis of the display mode transitioning on the basis of the surroundings situation recognized by the recognizer, and causes the image to be displayed, wherein the third image of the group of images, the fourth image of the group of images, the fifth image of the group of images, and the second image of the group of images are displayed based on the first image, wherein the display mode corresponding to the fourth mode also causes to be displayed a sixth image of the group of images that represents the surroundings of the first image, wherein the sixth image is an orientation image equally divided at a predetermined angular interval, and each of the equally divided orientation images is further divided according to its distance from the vehicle, and the orientation image is used to display the positions of objects around the vehicle and the direction in which the vehicle should travel.

2. The driving assistance device according to claim 1, wherein the display controller causes the first image imitating the vehicle in the third mode and the fourth mode to be displayed as a seventh image of the group of images when the vehicle is viewed from above, and causes the first image imitating the vehicle in the first mode, the second mode, and the fifth mode to be displayed as an eight image of the group of images when the vehicle is viewed from behind.

3. The driving assistance device according to claim 1, wherein, when the display controller causes the image to be displayed in the display mode corresponding to the fourth mode, the display controller causes the first image imitating the vehicle to be displayed to be larger than the first image imitating the vehicle displayed in the third mode.

4. The driving assistance device according to claim 1, wherein the display controller causes the image to be displayed in the display mode corresponding to the fourth mode when the vehicle travels while avoiding the object present in front of the vehicle or when the vehicle passes an oncoming traveling object, and when a distance to the object is smaller than a predetermined distance and a time to collision between the vehicle and the object is equal to or greater than a threshold value.

5. The driving assistance device according to claim 4, wherein the driving controller performs control to guide the occupant to perform the steering operation for avoiding contact between the vehicle and the object.

6. The driving assistance device according to claim 5, wherein the driving controller performs an operation of guiding the occupant to perform steering by using a reaction force to a steering wheel operated by the occupant.

7. The driving assistance device according to claim 1, wherein the display controller causes the image to be displayed in a display mode corresponding to the fourth mode when the recognizer recognizes another vehicle present in front of the vehicle and stopping while waiting for a right turn or a left turn.

8. A driving assistance method comprising:

recognizing, by a computer, a surroundings situation of a vehicle;

causing, by the computer, an image for assisting an occupant driving the vehicle to be displayed in a plurality of preset display modes on a display device;

executing, by the computer, driving control for controlling a driving operation with respect to the vehicle by the occupant or traveling of the vehicle, the plurality of display modes including display modes corresponding to at least a first mode in which the vehicle travels in a direction in which a road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects;

causing, by the computer, transition to any one of the plurality of display modes to be performed on the basis of the recognized surroundings situation;

when the display controller causes the image to be displayed in the display mode corresponding to the fourth mode, causing, by the computer, a first image of a group of images that imitates the vehicle to be displayed; and when there is an object around the vehicle, causing, by the computer, a direction in which the vehicle should travel to be displayed and causing a second image of the group of image that prompts the occupant to perform a steering operation to be displayed, selecting, by the computer, the image to be displayed, from among at least the first image of the group of images, a third image of the group of images that shows a position of the object around the vehicle, a fourth image of the group of images that shows the direction in which the vehicle should travel, a target position serving as a lane change destination of the vehicle, a fifth image of the group of images that actuates acceleration or deceleration, and the second image prompts the occupant to perform a steering operation on the basis of the display mode transitioning on the basis of the surroundings situation recognized, and causes the image to be displayed, wherein the third image of the group of images, the fourth image of the group of images, the fifth image of the group of images, and the second image of the group of images are displayed based on the first image, wherein the display mode corresponding to the fourth mode also causes to be displayed a sixth image of the group of images that represents the surroundings of the first image, wherein the sixth image is an orientation image equally divided at a predetermined angular interval, and each of the equally divided orientation images is further divided according to its distance from the vehicle, and the orientation image is used to display the positions of objects around the vehicle and the direction in which the vehicle should travel.

9. A computer-readable non-transitory storage medium having a program stored therein, the program causing a computer to:

recognize a surroundings situation of a vehicle;

cause an image for assisting an occupant driving the vehicle to be displayed in a plurality of preset display modes on a display device;

execute driving control for controlling a driving operation with respect to the vehicle by the occupant or traveling of the vehicle, the plurality of display modes including display modes corresponding to at least a first mode in which the vehicle travels in a direction in which a road extends, a second mode in which the vehicle travels at an intersection, a third mode in which the vehicle travels in a merging section, a fourth mode in which the vehicle travels on a narrow road, and a fifth mode in which the vehicle travels while avoiding contact with objects;

cause transition to any one of the plurality of display modes to be performed on the basis of the recognized surroundings situation;

when the display controller causes the image to be displayed in a display mode corresponding to the fourth mode, cause a first image of a group of images that imitates the vehicle to be displayed; and when there is an object around the vehicle, cause a direction in which the vehicle should travel to be displayed and cause a second image of the group of images that prompts the occupant to perform a steering operation to be displayed, select the image to be displayed, from among at least the first image of the group of images, a third image of the group of images that shows a position of the object around the vehicle, a fourth image of the group of images that shows the direction in which the vehicle should travel, a target position serving as a lane change destination of the vehicle, a fifth image of the group of images that actuates acceleration or deceleration, and the second image prompts the occupant to perform a steering operation on the basis of the display mode transitioning on the basis of the surroundings situation recognized, and causes the image to be displayed, wherein the third image of the group of images, the fourth image of the group of images, the fifth image of the group of images, and the second image of the group of images are displayed based on the first image, wherein the display mode corresponding to the fourth mode also causes to be displayed a sixth image of the group of images that represents the surroundings of the first image, wherein the sixth image is an orientation image equally divided at a predetermined angular interval, and each of the equally divided orientation images is further divided according to its distance from the vehicle, and the orientation image is used to display the positions of objects around the vehicle and the direction in which the vehicle should travel.

* * * * *